US011799864B2

(12) United States Patent
Huebner et al.

(10) Patent No.: US 11,799,864 B2
(45) Date of Patent: Oct. 24, 2023

(54) COMPUTER SYSTEMS FOR REGULATING ACCESS TO ELECTRONIC CONTENT USING USAGE TELEMETRY DATA

(71) Applicant: Altair Engineering, Inc., Troy, MI (US)

(72) Inventors: Michael Huebner, Troy, MI (US); Max Fariello, Troy, MI (US); Stephanie A. Scapa, San Mateo, CA (US)

(73) Assignee: Altair Engineering, Inc., Troy, MI (US)

( * ) Notice: Subject to any disclaimer, the term of this patent is extended or adjusted under 35 U.S.C. 154(b) by 739 days.

(21) Appl. No.: 16/783,660

(22) Filed: Feb. 6, 2020

(65) Prior Publication Data

US 2020/0259839 A1    Aug. 13, 2020

Related U.S. Application Data

(60) Provisional application No. 62/802,508, filed on Feb. 7, 2019.

(51) Int. Cl.
*G06F 15/16* (2006.01)
*H04L 9/40* (2022.01)
(Continued)

(52) U.S. Cl.
CPC ........ *H04L 63/102* (2013.01); *G06F 16/2379* (2019.01); *G06Q 10/087* (2013.01)

(58) Field of Classification Search
CPC .. H04L 63/102; G06F 16/2379; G06Q 10/087
See application file for complete search history.

(56) References Cited

U.S. PATENT DOCUMENTS 4,754,426 A    6/1988   Rast et al.
4,937,863 A    6/1990   Robert et al.
(Continued)

FOREIGN PATENT DOCUMENTS

CN    102356397    2/2012
EP     1862202    12/2007
(Continued)

OTHER PUBLICATIONS

Extended European Search Report in European Appln. No. 20156046.3, dated May 28, 2020, 9 pages.
(Continued)

*Primary Examiner* — Oleg Survillo
(74) *Attorney, Agent, or Firm* — Fish & Richardson P.C.

(57) ABSTRACT

A method is performed to regulate access to electronic content based on content usage telemetry data. A first computer receives, from a second computer system, a request for access to electronic content. The first computer system determines, based on an access profile associated with the second computer system, that the second computer system is authorized to access the electronic content. A first authorization message indicating that the second computer system is authorized to access the electronic content is transmitted from the first computer system to the second computer system. The first computer system receives, from the second computer system, content usage telemetry data including data items indicating metrics of use of the electronic content by the second computer system. The first computer system modifies the access profile of the second computer system based on the content usage telemetry data.

17 Claims, 15 Drawing Sheets

(51) Int. Cl.
*G06F 16/23* (2019.01)
*G06Q 10/087* (2023.01)

(56) References Cited

U.S. PATENT DOCUMENTS

| | | | |
|---|---|---|---|
| 5,204,897 A | 4/1993 | Wyman | |
| 5,260,999 A | 11/1993 | Wyman | |
| 5,390,297 A | 2/1995 | Barber et al. | |
| 5,438,508 A | 8/1995 | Wyman | |
| 5,579,222 A | 11/1996 | Bains et al. | |
| 5,606,493 A | 2/1997 | Duscher et al. | |
| 5,634,080 A | 5/1997 | Kikinis et al. | |
| 5,671,412 A | 9/1997 | Christiano | |
| 5,742,813 A | 4/1998 | Kavanagh et al. | |
| 5,745,879 A | 4/1998 | Wyman | |
| 5,752,041 A | 5/1998 | Fosdick | |
| 5,758,069 A | 5/1998 | Olsen | |
| 5,758,257 A | 5/1998 | Herz et al. | |
| 5,790,664 A | 8/1998 | Coley | |
| 5,835,910 A | 11/1998 | Kavanagh et al. | |
| 5,905,860 A | 5/1999 | Olsen et al. | |
| 5,920,861 A | 7/1999 | Hall | |
| 5,931,901 A | 8/1999 | Wolfe et al. | |
| 5,966,444 A | 10/1999 | Yuan et al. | |
| 5,973,683 A | 10/1999 | Cragun et al. | |
| 5,990,883 A | 11/1999 | Byrne et al. | |
| 6,009,401 A | 12/1999 | Horstmann | |
| 6,020,883 A | 2/2000 | Herz et al. | |
| 6,026,387 A | 2/2000 | Kesel | |
| 6,029,176 A | 2/2000 | Cannon | |
| 6,038,591 A | 3/2000 | Wolfe et al. | |
| 6,049,332 A | 4/2000 | Boetje et al. | |
| 6,049,789 A | 4/2000 | Prison et al. | |
| 6,088,722 A | 7/2000 | Herz et al. | |
| 6,101,606 A | 8/2000 | Diersch | |
| 6,118,492 A | 9/2000 | Milnes et al. | |
| 6,133,909 A | 10/2000 | Schein et al. | |
| 6,141,754 A | 10/2000 | Choy | |
| 6,160,570 A | 12/2000 | Sitnik | |
| 6,161,137 A | 12/2000 | Ogdon et al. | |
| 6,161,142 A | 12/2000 | Wolfe et al. | |
| 6,169,992 B1 | 1/2001 | Beall et al. | |
| 6,173,269 B1 | 1/2001 | Solokl et al. | |
| 6,182,050 B1 | 1/2001 | Ballard | |
| 6,198,906 B1 | 3/2001 | Boetje et al. | |
| 6,219,652 B1 | 4/2001 | Carter et al. | |
| 6,240,415 B1 | 5/2001 | Blumberg | |
| 6,256,664 B1 | 7/2001 | Donoho et al. | |
| 6,262,721 B1 | 7/2001 | Tsukidate et al. | |
| 6,263,362 B1 | 7/2001 | Donoho et al. | |
| 6,263,501 B1 | 7/2001 | Schein et al. | |
| 6,275,844 B1 | 8/2001 | Rail | |
| 6,286,140 B1 | 9/2001 | Ivanyi | |
| 6,317,881 B1 | 11/2001 | Shah-Nazaroff et al. | |
| 6,324,519 B1 | 11/2001 | Eldering | |
| 6,411,941 B1 | 6/2002 | Muller et al. | |
| 6,473,794 B1 | 10/2002 | Guheen et al. | |
| 6,502,079 B1 | 12/2002 | Ball | |
| 6,502,124 B1 | 12/2002 | Shimakawa et al. | |
| 6,519,571 B1 | 2/2003 | Guheen et al. | |
| 6,536,037 B1 | 3/2003 | Guheen et al. | |
| 6,574,612 B1 | 6/2003 | Baratti et al. | |
| 6,591,244 B2 | 7/2003 | Jim et al. | |
| 6,606,744 B1 | 8/2003 | Mikurak | |
| 6,615,166 B1 | 9/2003 | Guheen et al. | |
| 6,671,818 B1 | 12/2003 | Mikurak | |
| 6,721,713 B1 | 4/2004 | Guheen et al. | |
| 6,728,766 B2 | 4/2004 | Cox et al. | |
| 6,732,106 B2 | 5/2004 | Okamoto | |
| 6,816,882 B1 | 11/2004 | Conner et al. | |
| 6,859,792 B1 | 2/2005 | Marjadi et al. | |
| 6,889,206 B1 | 5/2005 | Nuttall | |
| 6,948,070 B1 | 9/2005 | Ginter | |
| 6,957,186 B1 | 10/2005 | Guheen et al. | |
| 6,966,832 B2 | 11/2005 | Leen | |
| 7,013,294 B1 | 3/2006 | Sekigawa et al. | |
| 7,036,091 B1 | 4/2006 | Nguyen | |
| 7,124,101 B1 | 10/2006 | Mikurak | |
| 7,130,807 B1 | 10/2006 | Mikurak | |
| 7,139,737 B2 | 11/2006 | Takahashi et al. | |
| 7,165,041 B1 | 1/2007 | Guheen et al. | |
| 7,194,439 B2 | 3/2007 | Kassan et al. | |
| 7,203,966 B2 | 4/2007 | Abburi et al. | |
| 7,209,900 B2 | 4/2007 | Hunter et al. | |
| 7,225,165 B1* | 5/2007 | Kyojima | H04L 9/3249 |
| | | | 705/52 |
| 7,231,370 B1 | 6/2007 | Kapur | |
| 7,299,209 B2 | 11/2007 | Collier | |
| 7,313,512 B1 | 12/2007 | Traut et al. | |
| 7,315,826 B1 | 1/2008 | Guheen et al. | |
| 7,343,365 B2 | 3/2008 | Farnham | |
| 7,395,245 B2 | 7/2008 | Okamoto et al. | |
| 7,590,601 B2 | 9/2009 | Shea et al. | |
| 7,630,986 B1 | 12/2009 | Herz | |
| 7,672,972 B1 | 3/2010 | Marjadi et al. | |
| 7,716,077 B1 | 5/2010 | Mikurak | |
| 7,788,272 B2 | 8/2010 | Ray | |
| 7,809,648 B2 | 10/2010 | Misra | |
| 7,818,350 B2 | 10/2010 | New et al. | |
| 7,859,551 B2 | 12/2010 | Bulman | |
| 7,898,648 B2 | 3/2011 | Ophey et al. | |
| 8,032,409 B1 | 10/2011 | Mikurak | |
| 8,073,780 B2 | 12/2011 | Marjadi | |
| 8,126,938 B2 | 2/2012 | Cohen | |
| 8,340,796 B2 | 12/2012 | Stefik | |
| 8,392,505 B2 | 3/2013 | Haughay, Jr. et al. | |
| 8,504,932 B2 | 8/2013 | Quek et al. | |
| 8,548,839 B2 | 10/2013 | Neilesh | |
| 8,831,998 B1 | 9/2014 | Cramer | |
| 8,943,425 B2 | 1/2015 | Wickramasuriya et al. | |
| 9,065,824 B1 | 6/2015 | Valdivia | |
| 9,135,580 B1 | 9/2015 | Lyman | |
| 9,678,637 B1 | 6/2017 | Brothers et al. | |
| 9,712,587 B1 | 7/2017 | Alfishawi et al. | |
| 10,120,983 B2 | 11/2018 | Smith, II et al. | |
| 10,230,673 B1 | 3/2019 | Lewis | |
| 10,623,289 B1* | 4/2020 | McCorkendale | H04L 43/0817 |
| 10,679,151 B2* | 6/2020 | Mahalingam | G06Q 10/00 |
| 10,685,055 B2 | 6/2020 | Scapa et al. | |
| 2001/0010046 A1 | 7/2001 | Muyres | |
| 2001/0011253 A1 | 8/2001 | Coley et al. | |
| 2001/0013024 A1 | 8/2001 | Takahashi et al. | |
| 2001/0037404 A1 | 11/2001 | Hafsteinsson | |
| 2002/0007298 A1 | 1/2002 | Parsons et al. | |
| 2002/0029347 A1 | 3/2002 | Edelman | |
| 2002/0046181 A1 | 4/2002 | Story, Jr. | |
| 2002/0049679 A1 | 4/2002 | Russell et al. | |
| 2002/0059094 A1 | 5/2002 | Hosea et al. | |
| 2002/0069263 A1 | 6/2002 | Sears et al. | |
| 2002/0069420 A1 | 6/2002 | Russell | |
| 2002/0091568 A1 | 7/2002 | Kraft et al. | |
| 2002/0120564 A1 | 8/2002 | Strietzel | |
| 2002/0129356 A1 | 9/2002 | Hellerstein et al. | |
| 2002/0156824 A1 | 10/2002 | Armstrong | |
| 2002/0161908 A1 | 10/2002 | Benitez | |
| 2002/0183045 A1 | 12/2002 | Emmerson et al. | |
| 2002/0194589 A1 | 12/2002 | Cristofalo et al. | |
| 2003/0036683 A1 | 2/2003 | Kehr et al. | |
| 2003/0046578 A1 | 3/2003 | Brown | |
| 2003/0050979 A1 | 3/2003 | Takahashi | |
| 2003/0059022 A1 | 3/2003 | Nebiker et al. | |
| 2003/0069263 A1 | 4/2003 | Hoffman et al. | |
| 2003/0084165 A1 | 5/2003 | Kjellberg et al. | |
| 2003/0084343 A1* | 5/2003 | Ramachandran | H04L 63/08 |
| | | | 709/217 |
| 2003/0135380 A1 | 7/2003 | Lehr et al. | |
| 2003/0135474 A1 | 7/2003 | Circenis et al. | |
| 2003/0144903 A1 | 7/2003 | Brechner | |
| 2003/0149993 A1 | 8/2003 | Son | |
| 2003/0182142 A1 | 9/2003 | Valenzuela et al. | |
| 2003/0208763 A1 | 11/2003 | McElhatten et al. | |
| 2004/0122774 A1 | 6/2004 | Studd et al. | |
| 2005/0033613 A1 | 2/2005 | Patullo | |
| 2005/0049931 A1 | 3/2005 | Wisnudel et al. | |

(56) References Cited

U.S. PATENT DOCUMENTS

| | | |
|---|---|---|
| 2005/0077349 A1 | 4/2005 | Bonalle |
| 2005/0182731 A1* | 8/2005 | Marjadi ............... G06Q 30/06 705/59 |
| 2006/0004668 A1 | 1/2006 | Hamnen et al. |
| 2006/0020556 A1 | 1/2006 | Hamnen et al. |
| 2006/0073820 A1 | 4/2006 | Craswell et al. |
| 2006/0106728 A1 | 5/2006 | Yellai et al. |
| 2006/0143134 A1 | 6/2006 | So et al. |
| 2006/0143236 A1 | 6/2006 | Wu |
| 2006/0153073 A1 | 7/2006 | Ghiware |
| 2006/0248017 A1 | 11/2006 | Koka et al. |
| 2006/0259930 A1 | 11/2006 | Rothschild |
| 2006/0287959 A1 | 12/2006 | Blecken |
| 2006/0294019 A1 | 12/2006 | Dayan et al. |
| 2007/0016599 A1 | 1/2007 | Plastina |
| 2007/0106622 A1 | 5/2007 | Boomershine et al. |
| 2007/0219923 A1 | 9/2007 | Shea et al. |
| 2007/0226150 A1 | 9/2007 | Pietrzak et al. |
| 2007/0226155 A1 | 9/2007 | Yu et al. |
| 2007/0233578 A1 | 10/2007 | Fusz et al. |
| 2007/0233837 A1 | 10/2007 | Imai |
| 2007/0244826 A1 | 10/2007 | Wang |
| 2007/0277233 A1 | 11/2007 | Bodin et al. |
| 2007/0299845 A1 | 12/2007 | Tokunaga |
| 2008/0005032 A1 | 1/2008 | Znidarsic |
| 2008/0015888 A1 | 1/2008 | Dang |
| 2008/0064493 A1 | 3/2008 | Andersson |
| 2008/0071689 A1 | 3/2008 | Tabet |
| 2008/0080552 A1 | 4/2008 | Gates et al. |
| 2008/0082450 A1 | 4/2008 | Grimm et al. |
| 2008/0083025 A1 | 4/2008 | Meijer et al. |
| 2008/0154798 A1 | 6/2008 | Valz |
| 2008/0178284 A1 | 7/2008 | Harwell |
| 2008/0208692 A1 | 8/2008 | Garaventi |
| 2008/0228533 A1 | 9/2008 | McGuire et al. |
| 2008/0228689 A1 | 9/2008 | Tewary et al. |
| 2008/0235116 A1 | 9/2008 | Jensen |
| 2008/0250349 A1 | 10/2008 | Peiro et al. |
| 2008/0263624 A1* | 10/2008 | Nakahara ............... G06F 21/10 726/1 |
| 2008/0288542 A1 | 11/2008 | Buttars |
| 2008/0319910 A1 | 12/2008 | Duffus et al. |
| 2009/0003712 A1 | 1/2009 | Mei et al. |
| 2009/0048860 A1 | 2/2009 | Brotman et al. |
| 2009/0094159 A1 | 4/2009 | Cunningham |
| 2009/0132435 A1 | 5/2009 | Titus et al. |
| 2009/0150343 A1 | 6/2009 | English |
| 2009/0240629 A1 | 9/2009 | Xie et al. |
| 2009/0281772 A1* | 11/2009 | Jamann ............ G01R 31/31725 703/1 |
| 2009/0287513 A1 | 11/2009 | Anderson |
| 2009/0319638 A1 | 12/2009 | Faith |
| 2009/0327437 A1 | 12/2009 | Estrada |
| 2010/0017725 A1 | 1/2010 | McCarthy et al. |
| 2010/0114531 A1 | 5/2010 | Korn |
| 2010/0185656 A1 | 7/2010 | Pollard |
| 2010/0186066 A1 | 7/2010 | Pollard |
| 2010/0217613 A1 | 8/2010 | Kelly |
| 2010/0223677 A1 | 9/2010 | Scapa |
| 2010/0228679 A1 | 9/2010 | Scapa |
| 2010/0251181 A1 | 9/2010 | Lal |
| 2010/0278453 A1 | 11/2010 | King |
| 2011/0047566 A1 | 2/2011 | Matuchniak |
| 2011/0113133 A1 | 5/2011 | Kelly |
| 2011/0213681 A1 | 9/2011 | Shahid |
| 2011/0239131 A1 | 9/2011 | Koren |
| 2011/0276501 A1* | 11/2011 | Sako ..................... G06F 21/10 705/310 |
| 2012/0022954 A1 | 1/2012 | Garcia et al. |
| 2012/0041812 A1 | 2/2012 | Postrel |
| 2012/0066089 A1 | 3/2012 | Henderson |
| 2012/0173975 A1 | 7/2012 | Herz et al. |
| 2012/0185389 A1 | 7/2012 | Ross |
| 2012/0226978 A1 | 9/2012 | Harberts et al. |
| 2012/0246734 A1 | 9/2012 | Pride et al. |
| 2012/0251080 A1 | 10/2012 | Svendsen |
| 2012/0272185 A1 | 10/2012 | Dodson |
| 2012/0272256 A1 | 10/2012 | Bedi |
| 2012/0296681 A1 | 11/2012 | Fitzgerald |
| 2012/0317198 A1 | 12/2012 | Patton |
| 2013/0042262 A1 | 2/2013 | Riethmueller |
| 2013/0054279 A1 | 2/2013 | Sharp |
| 2013/0124155 A1* | 5/2013 | Miller ................ G06Q 10/101 703/1 |
| 2013/0138426 A1 | 5/2013 | DelRocco |
| 2013/0145385 A1 | 6/2013 | Aghajanyan et al. |
| 2013/0166649 A1 | 6/2013 | Atzmon |
| 2013/0179680 A1 | 7/2013 | Peterka |
| 2013/0185656 A1 | 7/2013 | Heikes et al. |
| 2013/0246916 A1 | 9/2013 | Reimann et al. |
| 2013/0311768 A1 | 11/2013 | Fosmark |
| 2013/0312022 A1 | 11/2013 | Yoon |
| 2013/0332395 A1 | 12/2013 | Kim et al. |
| 2013/0339362 A1 | 12/2013 | Yang |
| 2013/0339397 A1 | 12/2013 | Herasymchuk |
| 2014/0122350 A1* | 5/2014 | Takemoto ............ G06Q 30/018 705/317 |
| 2014/0208391 A1 | 7/2014 | Farnsworth |
| 2014/0222775 A1 | 8/2014 | Zohar et al. |
| 2014/0258029 A1 | 9/2014 | Thierry |
| 2014/0278968 A1 | 9/2014 | Strompolos |
| 2014/0280079 A1 | 9/2014 | Jain |
| 2014/0280899 A1 | 9/2014 | Brewster, Jr. |
| 2014/0372315 A1 | 12/2014 | Faith |
| 2014/0379705 A1 | 12/2014 | Zureiqat |
| 2014/0379729 A1 | 12/2014 | Savage |
| 2015/0051925 A1 | 2/2015 | Yudin et al. |
| 2015/0074413 A1 | 3/2015 | Hao |
| 2015/0088668 A1 | 3/2015 | Bruce |
| 2015/0117631 A1 | 4/2015 | Tuchman |
| 2015/0120357 A1 | 4/2015 | Tuchman |
| 2015/0193600 A1 | 7/2015 | Matsuda |
| 2015/0287247 A1* | 10/2015 | Willis .............. G06K 19/07758 345/419 |
| 2015/0294221 A1 | 10/2015 | Andres Gutierrez et al. |
| 2015/0302321 A1 | 10/2015 | Scapa et al. |
| 2015/0310354 A1 | 10/2015 | Mahalingam et al. |
| 2015/0310513 A1 | 10/2015 | Fariello et al. |
| 2015/0346928 A1 | 12/2015 | MacArthur |
| 2015/0379118 A1 | 12/2015 | Wickenkamp |
| 2016/0057473 A1 | 2/2016 | Mitchell |
| 2016/0092780 A1 | 3/2016 | Kelley |
| 2016/0239547 A1 | 8/2016 | Lim et al. |
| 2016/0253710 A1 | 9/2016 | Publicover |
| 2016/0297398 A1 | 10/2016 | Jefferies |
| 2016/0359816 A1 | 12/2016 | Vedula |
| 2017/0011482 A1* | 1/2017 | Shimoda ............... G06Q 50/184 |
| 2017/0295119 A1 | 10/2017 | Rosenberg |
| 2017/0300456 A1 | 10/2017 | Rimmer |
| 2017/0339081 A1 | 11/2017 | Beust |
| 2018/0046944 A1 | 2/2018 | Barbera |
| 2018/0124105 A1 | 5/2018 | Rodrigues |
| 2018/0249017 A1* | 8/2018 | Karam .................. H04W 4/24 |
| 2018/0287893 A1* | 10/2018 | O'Brien ............. H04L 12/1403 |
| 2018/0349641 A1 | 12/2018 | Barday |
| 2019/0215344 A1 | 7/2019 | Barday |
| 2019/0222476 A1 | 7/2019 | McEntee |
| 2019/0332803 A1 | 10/2019 | Barday |
| 2019/0340271 A1* | 11/2019 | Faulhaber ........... G06F 16/2433 |
| 2020/0110641 A1* | 4/2020 | Hollinger ................ G06F 9/505 |
| 2020/0259839 A1* | 8/2020 | Huebner ............ G06F 16/2379 |
| 2020/0380093 A1* | 12/2020 | Sugaya ................ G06F 21/105 |

FOREIGN PATENT DOCUMENTS

| | | |
|---|---|---|
| EP | 2409258 | 1/2012 |
| EP | 2414954 | 2/2012 |
| JP | 2002/091595 | 3/2002 |
| JP | 2005/250635 | 9/2005 |
| JP | 2007/265193 | 10/2007 |
| JP | 2007/286703 | 11/2007 |
| KR | 2001/0095908 | 11/2001 |
| KR | 101185968 | 9/2012 |
| WO | WO 1992/20021 | 10/1992 |

(56) References Cited

FOREIGN PATENT DOCUMENTS

| WO | WO 2010/108006 | 9/2010 |
|---|---|---|
| WO | WO 2010/115107 | 10/2010 |
| WO | WO 2012/048086 | 4/2012 |

OTHER PUBLICATIONS

Altair Releases HyperWorks 9.0, Connecting Engineerings with New Solver Technology and to the Global Grid:Newest version of Altair's simulation platform delivers on-demand access to the ISV applications and offers multi-core licensing business model Anonymous. PR Newswire [New York] May 19, 2008, downloaded from ProQuestDirect on the Internet 06, 3 pages.
Brignail, *Peugeot launches car club with a difference*, The Guardian, Jul. 9, 2010, retrieved from: http://www.guardian.co.uk/money/2010/jul10/peugeot-car-club-mu/print on Oct. 4, 2011.
CN Office Action for CN App No. 201080012394.2 dated Nov. 1, 2013, 8 pages.
EP Suppl Search Report for EP App No. 10754111.2 dated Aug. 14, 2012, 5 pages.
EP Suppl Search Report for EP App No. 10759478.0 dated Apr. 18, 2013, 5 pages.
International Preliminary Report on Patentability for Intl Pat App No. PCT/US2010/027820 dated Sep. 20, 2011, 6 pages.
International Preliminary Report on Patentability for Intl Pat App No. PCT/US2010/029787 dated Oct. 4, 2011, 4 pages.
International Search Report and Written Opinion for Intl App No. PCT/US2011/055060 dated Dec. 27, 2012, 3 pages.
International Search Report and Written Opinion for Intl Pat App No. PCT/US2010/027820 dated Oct. 26, 2010, 3 pages.
International Search Report for Intl App No. PCT/US2010/029787 dated Nov. 2, 2010, 3 pages.
JP Office Action for JP 2012-503741 dated Jan. 20, 2014, 4 pages.
Levine, *Share My Ride*, The New York Times, Mar. 8, 2009, retrieved from: http://www.nytimes.com/2009/03/08/magazine/08Zipcar-1.html?pagewanted=print on Oct. 4, 2011.
Zipcar, "is zipcar for me", retrieved from: http://www.zipcar.com/is-il/ on Oct. 4, 2011.
Zipcar, "rates & plans", retrieved from: http://www.zipcar.com/allanta/check-rates on Oct. 4, 2011.

* cited by examiner

| Domain A
15 Units | Domain B
10 Units | Domain C
20 Units |
|---|---|---|
| Content A1 | Content B1 | Content C1 |
| Content A2 | Content B2 | Content C2 |
| Content A3 | Content B3 | Content C3 |

Usage:

| Content A2 | Content B1 | Content B2 |
|---|---|---|

Total: 35 Units (15 + 10 + 10)

FIG. 5

Usage:

Total: 15 Units

| Domain A<br>15 Units | Domain B<br>10 Units | Domain C<br>20 Units |
|---|---|---|
| Content A1 | Content B1 | Content C1 |
| Content A2 | Content B2 | Content C2 |
| Content A3 | Content B3 | Content C3 |

Usage:

| Content A2 | Content B1 | Content B2 |
|---|---|---|

Total: 25 Units (15 + 10)

FIG. 7

COMPUTER SYSTEMS FOR REGULATING ACCESS TO ELECTRONIC CONTENT USING USAGE TELEMETRY DATA

CROSS-REFERENCE TO RELATED APPLICATIONS

This application claims priority to U.S. Provisional Patent Application No. 62/802,508, filed Feb. 7, 2019, which is incorporated herein by reference in its entirety.

TECHNICAL FIELD

This description relates to computer systems for regulating access to electronic content using usage telemetry data.

BACKGROUND

Computer systems can be used to generate and modify electronic content. As an example, computer-aided engineering (CAE) or computer-aided design (CAD) systems can be used to generate computerized models representing electrical, mechanical, and/or chemical systems, and simulate the characteristics of the systems under various conditions. In some cases, computerized models can be generated by incorporating multiple computerized sub-models. For example, a computerized model representing a vehicle can include sub-models representing certain components or sub-systems of the vehicle (e.g., the electrical sub-system, the engine, the environmental regulation sub-systems, etc.).

SUMMARY

Computer systems can be used to regulate access to electronic content using usage telemetry data. As an example, a computer system can include a content management platform that stores electronic content items, and makes the electronic content items available to one or more other computer systems (e.g., one or more client computer systems) for retrieval and use. Further, the content management platform can monitor the retrieval and use of the electronic content items by the client computer systems, and regulate access to the electronic content items based on the information. As an example, the content management platform can collect usage telemetry data describing the manner in which particular electronic content items are retrieved and used by each of the client computer systems. Further, the content management platform can dynamically regulate the access to the electronic content items based on the usage telemetry data (e.g., dynamically provide access to certain electronic content items by certain client computer systems, restrict access to certain electronic content items by certain client computer systems, and/or allocate resources to one or more entities based on usage patterns).

The implementations described herein can provide a variety of benefits. For example, the content management platform can automatically manage access to electronic contents items based on the dynamic usage characteristics of each of the client computer systems. Accordingly, the content management platform can automatically adapt the distribution of electronic content items to account for variations in the operation of each of the client computer systems, without the need for manual human intervention. Thus, electronic content items can be distributed and used more effectively and efficiently in a wide array of technical environments.

In an aspect, a method for regulating access to electronic content based on content usage telemetry data includes receiving, by a first computer system from a second computer system, a request for access to first electronic content. The second computer system is associated with an access profile. The method also includes determining, by the first computer system based on the access profile, that the second computer system is authorized to access the first electronic content. The method also includes transmitting, from the first computer system to the second computer system, a first authorization message indicating that the second computer system is authorized to access the first electronic content. The method also includes receiving, by the first computer system from the second computer system, content usage telemetry data. The content usage telemetry data includes one or more data items indicating metrics of use of the first electronic content by the second computer system. The method also includes modifying, by the first computer system, the access profile of the second computer system based on the content usage telemetry data.

Implementations of this aspect can include one or more of the following features.

In some implementations, the first electronic content can include one or more of a data object for use in a computerized model, an image, a video, audio, or textual data.

In some implementations, the content usage telemetry data can include one or more data items indicating a length of time that the electronic is in use by the second computer system.

In some implementations, the content usage telemetry data can include one or more data items indicating one or more types of usage of the first electronic content by the second computer system.

In some implementations, the content usage telemetry data can include one or more data items indicating, for each type of usage of the first electronic content by the second computer system, a length of time that the electronic is in use by the second computer system according to that type of usage.

In some implementations, the one or more types of usage can include one or more of including the first electronic content in second electronic content, presenting the first electronic content to a user, or performing one or more data processing techniques with respect to the first electronic content.

In some implementations, including the first electronic content in the second electronic content can include including the first electronic content in a computerized model.

In some implementations, presenting the first electronic content the user can include displaying at least a portion of the first electronic content to the user using a display device.

In some implementations, performing one or more data processing techniques with respect to the first electronic content can include including the first electronic content in a computerized model and simulating an operation of an apparatus using the computerized model.

In some implementations, the content usage telemetry data can be received periodically by the first computer system from the second computer system.

In some implementations, the content usage telemetry data can be received continuously by the first computer system from the second computer system.

In some implementations, the content usage telemetry data can be transmitted by the second computer system to the first computer system in response to a trigger event.

In some implementations, the trigger event can be an end of a usage session of the first electronic content.

In some implementations, the access profile can include an indication of a number of licensing units available for use by the second computer system. Determining that the second computer system is authorized to access the first electronic content can include determining that the number of licensing units available for use by the second computer system is greater than or equal to a number of licensing units associated with the first electronic content.

In some implementations, the method can further include reducing the number of licensing units available for use by the second computer system by the number of licensing units associated with the first electronic content responsive to the request.

In some implementations, modifying the access profile of the second computer system based on the content usage telemetry data can include increasing or decreasing the number of licensing units available for use by the second computer system based on the content usage telemetry data.

In some implementations, the method can further include determining an amount of funds associated with usage of the first electronic content by the second computer system based on the content usage telemetry data.

In some implementations, first electronic content is stored by the first computer system. The first computer system can transmit the first electronic content to the second computer system upon determining that the second computer system is authorized to access the first electronic content.

In some implementations, first electronic content can be stored by a third computer system. The third computer system can transmit the first electronic content to the second computer system upon receiving a second authorization message from the first computer system indicating that the first computer system is authorized to access the first electronic content.

Other implementations are directed to systems, devices and non-transitory, computer-readable mediums (e.g., for performing one or more of the techniques described herein). As an example, in an aspect, a system for performing one or more of the techniques described herein can include one or more processors, and one or more non-transitory computer-readable media including one or more sequences of instructions which, when executed by the one or more processors, causes the performance of one or more of the techniques described herein. As another example, in another aspect, one or more non-transitory computer-readable media can include one or more sequences of instructions which, when executed by one or more processors, causes the performance of one or more of the techniques described herein.

The details of one or more embodiments are set forth in the accompanying drawings and the description below. Other features and advantages will be apparent from the description and drawings, and from the claims.

BRIEF DESCRIPTION OF THE DRAWINGS

FIG. 5 is a diagram of an example technique for determining a cost associated with the retrieval and/or use of multiple electronic content items.

FIG. 7 is a diagram of another example technique for determining a cost associated with the retrieval and/or use of multiple electronic content items.

DETAILED DESCRIPTION

Figure 1:
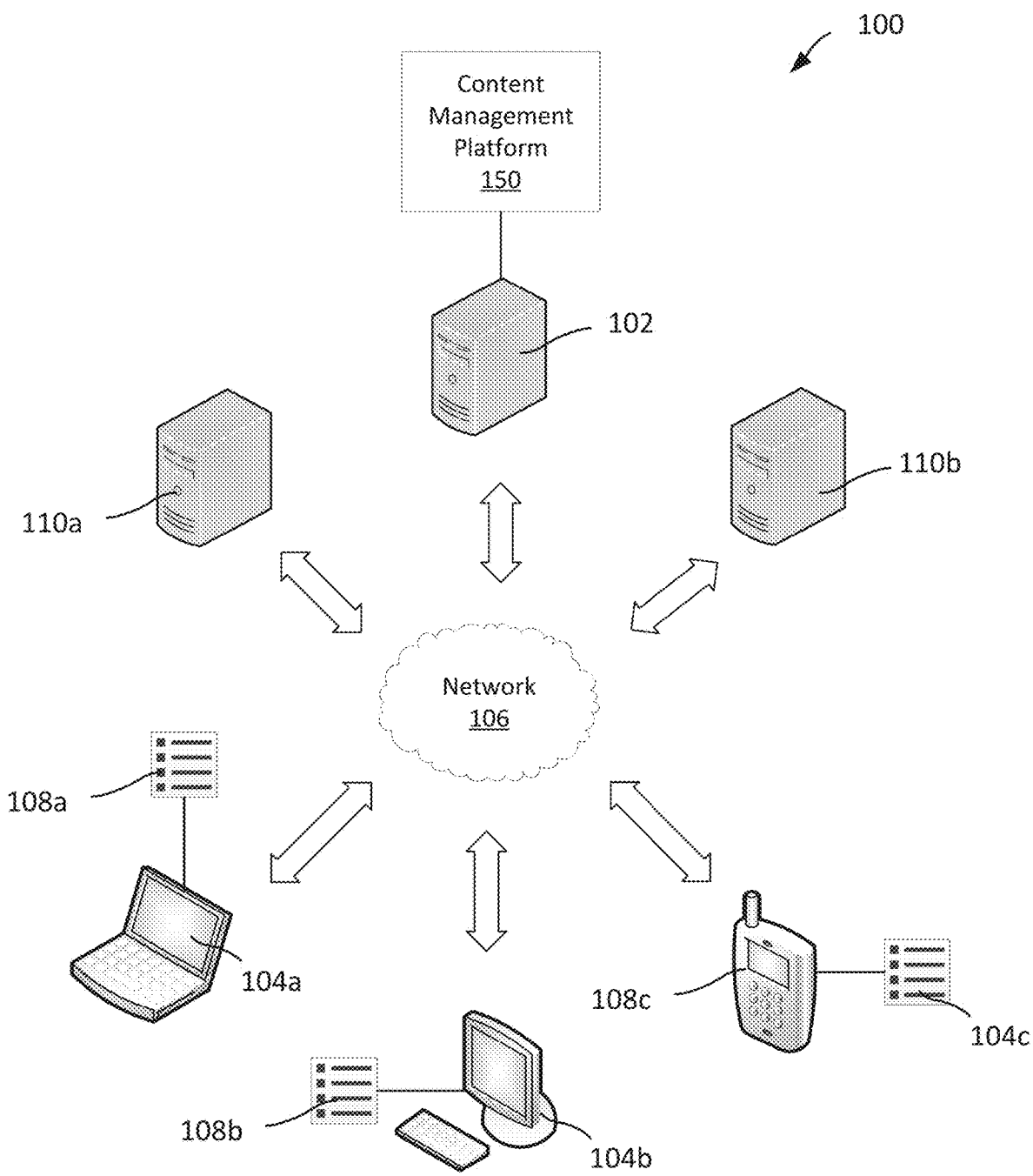
FIG. 1 is a diagram of an example system for regulating access to electronic content using usage telemetry.

A content management platform can dynamically regulate access to electronic content using usage telemetry data. For instance, a content management platform can store electronic content items (e.g., data files, images, computerized models, and/or other electronic data), and make the electronic content items available to one or more other computer systems (e.g., one or more client computer systems) for retrieval and use. Further, the content management platform can monitor the retrieval and use of the electronic content items by the client computer systems, and regulate access to the electronic content items based on the information.

For instance, the content management platform can collect usage telemetry data describing the manner in which particular electronic content items are retrieved and used by each of the client computer systems (e.g., the number of times that electronic content items are retrieved, the period of time that the electronic content items are used by the client computer systems, the nature of the use, etc.). Further, the content management platform can dynamically regulate the access to the electronic content items based on the usage telemetry data (e.g., dynamically provide access to certain electronic content items by certain client computer systems, restrict access to certain electronic content items by certain client computer systems, and/or allocate resources to one or more entities based on usage patterns).

As an example, the content management platform can store computerized models representing particular components of electrical, mechanical, and/or chemical systems, and make the computerized models available for retrieval and use by one or more client computer systems. A client computer system can retrieve a particular computerized model from the content management platform, display the computerized model to a user, modify the computerized model, incorporate the computerize model into other electronic content (e.g., insert the computerized model into other computerized models), and/or perform one or more operations using the computerized model (e.g., execute a simulation analysis using the computerized model to simulate the characteristics of the component under various conditions).

Further, the content management platform can collect usage telemetry data describing the retrieve and usage of the computerized model by the client computer system. For example, the content management platform can collect telemetry data describing the time at which the computerized model was retrieved by the client computer system, the number of times that it was retrieved by the client computer system, whether the computerized model was shared by the client computer system with others, etc. Further, the content management platform can collect telemetry data describing whether the computerized model was displayed to a user (e.g., whether the contents of the computerized model were presented to a user on a display device), and if so, the length of time that it was displayed. Further, the content management platform can collect telemetry data describing whether the computerized model was modified (e.g., whether the computer code, the parameters, or other attributes of the computerized model were altered), and if so, the nature of the modification. Further, the content management platform can collect telemetry data describing whether the computerized model was incorporated into other electronic content (e.g., inserted into another computer model), and if so, the nature of the incorporation (e.g., the number of times that it was incorporated into another computer model, the identity of the other computer model, etc.). Further, the content management platform can collect data describing whether any operations were performed using the computerized model (e.g., whether the computerized model was used in during the execution of a simulation analysis), and if so, the nature of the operations.

Further, the content management platform can dynamically regulate the access to the computerized model based on the usage telemetry data. For example, while the client computer system is using the computerized model, the content management system can restrict access by the client computer system to certain other computerized models (e.g., to moderate the consumption of resources by the client computer system). As another example, the content management system can allocate resources to one or more entities based on usage patterns (e.g., assess fees to entities associated with the client computer system, provide royalties or reimbursements to the owners of the computerized model, etc.).

The implementations described herein can provide a variety of benefits. For example, the content management platform can automatically manage access to electronic contents items based on the dynamic usage characteristics of each of the client computer systems. Accordingly, the content management platform can automatically adapt the distribution of electronic content items to account for variations in the operation of each of the client computer systems, without the need for manual human intervention. Thus, electronic content items can be distributed and used more effectively and efficiently in a wide array of technical environments.

An example system 100 for regulating access to electronic content using usage telemetry data is shown in FIG. 1. The system 100 includes a content management platform 150 maintained on a server computer system 102 that includes one or more server computers.

The server computer system 102 is illustrated as a respective single component. However, in practice, it can be implemented on one or more computing devices (e.g., each computing device including at least one processor such as a microprocessor or microcontroller). A server computer system 102 can be, for instance, a single computing device that is connected to the network 106, and the content management platform 150 can be maintained and operated on the single computing device. In some implementations, the server computer system 102 can include multiple computing devices that are connected to the network 106, and the content management platform 150 can be maintained and operated on some or all of the computing devices. For instance, the server computer system 102 can include several computing devices, and the content management platform 150 can be distributive on one or more of these computing devices. In some implementations, the server computer system 102 need not be located locally to the rest of the system 100, and portions of a server computer system 102 can be located in one or more remote physical locations.

The server computer system 102 is communicatively connected to client computer systems 104a-c using the network 106. Each client computer system 104a-c includes a respective user interface 108a-c. Users interact with the user interfaces 108a-c to view data (e.g., data on the server computer system 102 and the platform 150, and/or data on other the client computer systems 104a-c). Users also interact with the user interfaces 108a-c to transmit data to other devices (e.g., to the server computer system 102 and the platform 150, and/or to the other client computer systems 104a-c). Users interact with the user interfaces 108a-c to issue commands (e.g., to the server system 102 and the platform 150, and/or to the other client devices 104a-c). Commands can be, for example, any user instruction to the server computer system 102 and/or to the other client computer systems 104a-c. In some implementations, a user can install a software application onto a client computer system 104a-c in order to facilitate performance of these tasks.

A client computer system 104a-c can be any electronic device that is used by a user to view, process, transmit and receive data. Examples of the client computer systems 104a-c include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client dev computer systems ices 104a-c can include devices that operate using one or more operating system (e.g., Microsoft Windows, Apple OS X, Linux, Unix, Android, Apple iOS, etc.) and/or architectures (e.g., x86, PowerPC, ARM, etc.) In some implementations, one or more of the client computer systems 104a-c need not be located locally with respect to the rest of the system 100, and one or more of the client computer systems 104a-c can be located in one or more remote physical locations. In some implementations, the client computer systems 104a-c can communicate with a geo-positioning system (e.g., a global positioning system [GPS], Wi-Fi triangular system, and so forth) in order to determine its geographical location.

The server computer system 102 is also communicatively connected to content computer systems 110a and 110b using the network 106. The content computer systems 110a and 110b store electronic content items (e.g., one or more data files, images, audio files, video files, computerized models, text files, and/or other electronic content). Each content computer system 110a and 110b is illustrated as a respective single component. However, in practice, a content computer system 110a or 110b can be implemented on one or more computing devices (e.g., each computing device including at least one processor such as a microprocessor or microcontroller). A content computer system 110a or 110b can be, for instance, a single computing device that is connected to the network 106. In some implementations, a content computer system 110a or 110b can include multiple computing devices that are connected to the network 106. In some implementations, the content computer system 110a and 110b need not be located locally to the rest of the system 100, and portions of the content computer system 110a and 110b can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
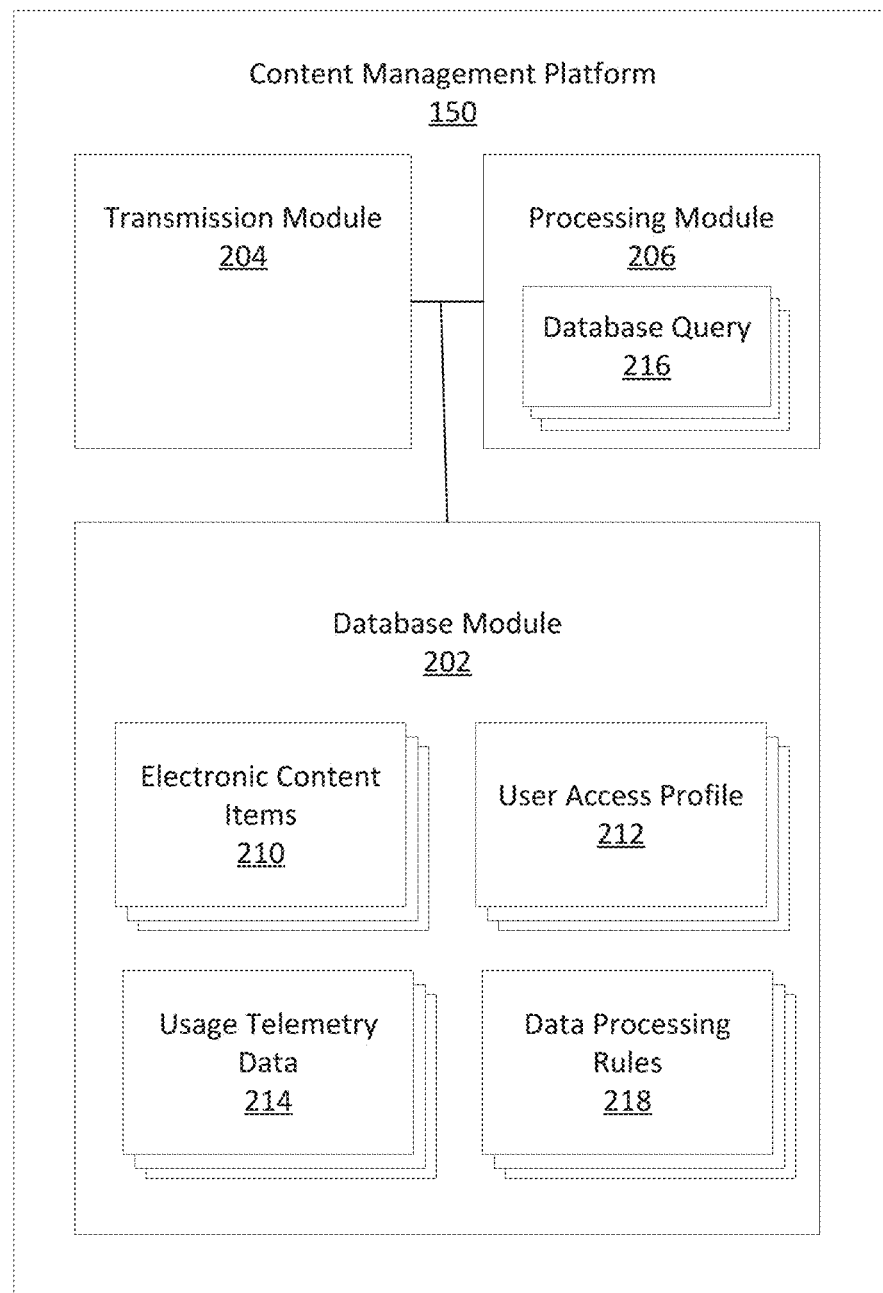
FIG. 2 is a diagram of an example content management platform.

FIG. 2 shows various aspects of the content management platform 150. The content management platform 150 includes several modules that perform particular functions related to the operation of the system 100. For example, the content management platform 150 can include a database module 202, a transmission module 204, and a processing module 206.

The database module 202 stores electronic content items 210 that can be retrieved by the client computer systems 104*a-c*. For example, the database module 202 can store one or more data files, images, audio files, video files, computerized models (e.g., CAD models, CAE models, etc.), text files, and/or other electronic content. In some cases, at least some of the electronic content items stored by the database module 202 are obtained from the content computer systems 110*a* and/or 110*b*. Further, the database module 202 can store information describing the electronic content items. For example, the database module 202 can store, for each electronic content item, the source of the electronic content item, a description of the contents of the electronic content item, and/or an amount of resources associated with the electronic content item (e.g., a unit cost, credit cost, monetary cost, etc. for retrieving and/or using the electronic content item). As another example, if the electronic content item is a computerized model of a component or system, the database module 202 can store a description of the component or system, an indication of a category or classification of the component or system, and/or other information regarding the component or system.

In some cases, the amount of resources associated with the electronic content item can differ, depending on how the electronic content item is used. For instance, a particular electronic content item can be associated with a first cost for a first type of usage (e.g., $N_1$ units for viewing the content item), a second cost for a second type of usage (e.g., $N_2$ units for modifying the content item), a third cost for a third type of usage (e.g., $N_3$ units for including the content item other content), a fourth cost for a fourth type of usage (e.g., $N_4$ units for executing a simulation analysis using the content item), and so forth.

In some cases, the amount of resources associated with the electronic content item can differ, depending on how often electronic content item is used. For instance, a particular electronic content item can be associated with a cost per instance of usage and/or a cost that varies according to time. As an example, the electronic content item can be associated with a cost of $N_5$ each time the electronic content item is used in a particular way. As another example, the electronic content item can be associated with a cost of $N_6$ for each second that the electronic content item is used in a particular way.

In some cases, the each electronic content item can be associated with a particular royalty or reimbursement to be paid to a particular entity (e.g., the owner of the electronic content item) based on a usage of the electronic content item. For instance, a particular electronic content item can be associated with a first royalty for a first type of usage (e.g., $R_1$ units for viewing the content item), a second royalty for a second type of usage (e.g., $R_2$ units for modifying the content item), a third royalty for a third type of usage (e.g., $R_3$ units for including the content item other content), a fourth royalty for a fourth type of usage (e.g., $R_4$ units for executing a simulation analysis using the content item), and so forth.

Further, the royalty associated with the electronic content item can differ, depending on how often electronic content item is used. For instance, a particular electronic content item can be associated with a royalty per instance of usage and/or a royalty that varies according to time. As an example, the electronic content item can be associated with a royalty of $R_5$ each time the electronic content item is used in a particular way. As another example, the electronic content item can be associated with a royalty of $R_6$ for each second that the electronic content item is used in a particular way.

The database module 202 also stores user access profile 212 related to one or more users of the system 100. As an example, the database module 202 can store information regarding the users of the client computer systems 104*a-c* and/or the content computer systems 110*a* and 110*b*, such as the users' identity credentials (e.g., user names and passwords), contact information (e.g., e-mail addresses, physical addresses, phone numbers, and so forth), geographical locations, or other information. As another example, the database module 202 can store information describing access permissions granted to the users by the content management platform 150. For instance, the database module 202 can store information indicating whether each user has permission to retrieve electronic content items from the content management platform 150, and if so, the specific electronic content items to which the user has access. As another example, the database module 202 can store information describing resources associated with the user. For instance, the database module 202 can store information indicating a pool of available resources available to a user (e.g., units, credits, monetary funds, etc.). As another example, the database module 202 can store information describing financial accounts associated with the user (e.g., a bank account, deposit account, credit card account, etc.).

The database module 202 also stores usage telemetry data 214 describing the retrieval and/or use of the electronic content items by the client computer systems 104*a-c* and/or their users. As an example, the usage telemetry data 214 can include, for each electronic content item, an indication of the time at which the computerized model was retrieved by a particular client computer system, an indication of the number of times that it was retrieved by the client computer system, whether the computerized model was shared by the client computer system with others, etc. Further, the usage telemetry data 214 can include, for each electronic content item, an indication whether the electronic content was displayed to a user (e.g., whether the contents of the electronic content item were presented to a user on a display device), and if so, the length of time that it was displayed. Further, the usage telemetry data 214 can include, for each electronic content item, an indication whether the electronic content item was modified (e.g., whether the computer code, the parameters, or other attributes of the electronic content item were altered), and if so, the nature of the modification. Further, the usage telemetry data 214 can include, for each electronic content item, an indication whether the electronic content item was incorporated into other electronic content (e.g., inserted into another electronic content, such as a computerized model), and if so, the nature of the incorporation (e.g., the number of times that it was incorporated into other electronic content, the identity of the other electronic content, etc.). Further, the usage telemetry data 214 can include, for each electronic content item, an indication whether any operations were performed using the electronic content item (e.g., whether the electronic content item was used in during the execution of a simulation analysis), and if so, the nature of the operations. In some cases, the usage telemetry data 214 can be collected by one or more of the client computer systems 104a-c and transmitted to the content management platform 150. In some cases, the usage telemetry data 214 can be directly generated by the content management platform 150 (e.g., by monitoring the operation of the client computers 104a-c via the communications network 106.

Although different examples of information are described above, these are merely illustrative. In practice, the database module 202 can store any information related to the users of the platform 150, the electronic content items, or any other information pertaining to the platform 150.

Further, the database module 202 can execute database queries 216. Database queries can be, for example, commands that specify that particular data be retrieved, modified, and/or deleted from the database module 202. In response, the database module 202 can execute the queries to fulfill the request, or direct another component of the content management platform 150 to execute the query. In some cases, database queries 216 can be generated by the processing module 206 (e.g., based on a user's instructions), and transmitted to the database module 202 for execution. In some cases, database queries 216 can be generated and executed by the processing module 206 directly (e.g., the processing module 206 can directly retrieve, modify, and/or delete data stored in the database module 202).

In some cases, the database module 202 can process data stored in the database module 202 in accordance with one or more data processing rules 218. These data processing rules 218 can specify particular conditions and/or factors for processing data, such that the data stored in the database module 202 is more useful to a user and/or is stored more efficiently by the content management platform 150. As an example, the data processing rules 218 can specify how certain electronic content items 210 can be retrieved and/or modified based on a user's instructions, user access profile 212, and/or usage telemetry data 214. The data processing rules 218 also can be stored by the database module 202. Example implementations of the data processing rules 218 are discussed in greater detail below.

The transmission module 204 allows for the transmission of data to and from the content management platform 150. For example, the transmission module 204 can be communicatively connected to the network 106, such that it can transmit data to the client computer systems 104a-c, and receive data from the client computer systems 104a-c via the network 106. As an example, information inputted by users on the client computer systems 104a-c can be transmitted to the content management platform 150 through the transmission module 204. This information can then be processed (e.g., using the processing module 206) and/or stored (e.g., using the database module 202). As another example, information from the content management platform 150 (e.g., information stored on the database module 202) can be transmitted to the client computer systems 104a-c through transmission module 204.

The processing module 206 processes data stored or otherwise accessible to the content management platform 150. For instance, the processing module 206 can execute automated or user-initiated processes that manipulate data pertaining to one or more users or electronic content items.

As an example, the processing module 206 can generate and then transmit database queries 216 to database module 202 to retrieve, modify, and/or delete data stored on the database module 202. As another example, the processing module 206 can generate and execute the database queries 216 directly (e.g., the processing module 206 can execute the database queries 216 to directly retrieve, modify, and/or delete data stored in the database module 202). Further, the processing module 206 can process data that is received from the transmission module 204. Likewise, processed data from the processing module 206 can be stored on the database module 202 (e.g., using one or more database queries 216) and/or sent to the transmission module 204 for transmission to other devices. Example processes that can be performed by the processing module 206 are described in greater detail below.

In some cases, the database module 202 and/or the processing module 206 can process data stored in the database module 202 in accordance with one or more data processing rules 218. These data processing rules 218 can specify particular operations that are performed with respect to the data stored by the database module 202 based on particular conditions, criteria, and/or factors. In some cases, data that is processed in accordance with these rules can be rendered more useful to a user and/or can be stored more efficiently by the content management platform 150. As an example, the data processing rules 218 can specify how certain electronic content items can be accessed and/or modified based on a user's instructions, user access profile 212, and/or usage telemetry data 214. In some cases, the data processing rules 218 can be stored by the processing module 206 (e.g., so that the processing module 206 can directly access the processing rules 218). In some cases, the data processing rules 218 can be stored by the database module 202. Example implementations of the data processing rules 218 are discussed in greater detail below.

As described above, one or more implementations of the content management platform 150 enable a user to regulate access to electronic content using usage telemetry data. An example of this functionality is illustrated in FIGS. 3A-3F.

Figure 3A:
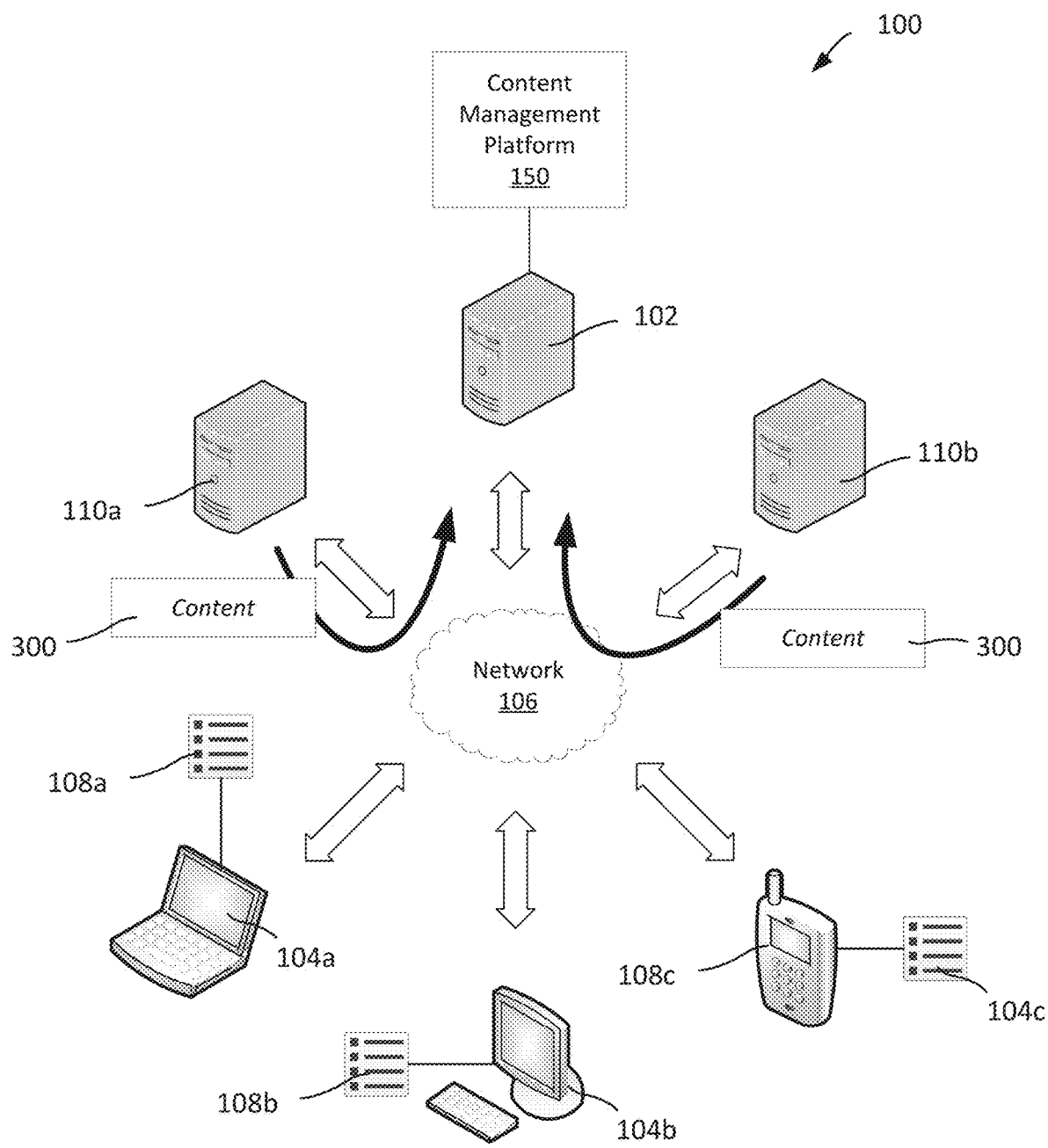
FIGS. 3A-3F are diagrams of an example usage of a system for regulating access to electronic content using usage telemetry.

As shown in FIG. 3A, the content computer systems 110a and 110b transmit content 300 to the server computer system 102 and the content management platform 150 via the network 106. The content 300 can include, for example, one or more electronic content items (e.g., one or more data files, images, audio files, video files, computerized models, text files, and/or other electronic content). The content computer systems 110a and 110b can transmit the content 300 continuously, periodically, intermittently, or according to some other pattern. In some cases, the content computer systems 110a and 110b can be operated by a different entity or a different group of entities than the operator of the content management platform 150. As an example, the content computer systems 110a and 110b can be operated by a content provider (e.g., an entity that produces electronic content items), and the content management platform 150 can be operated by a content manager (e.g., an entity that manages and distributes electronic content items on behalf of others).

Figure 3B:
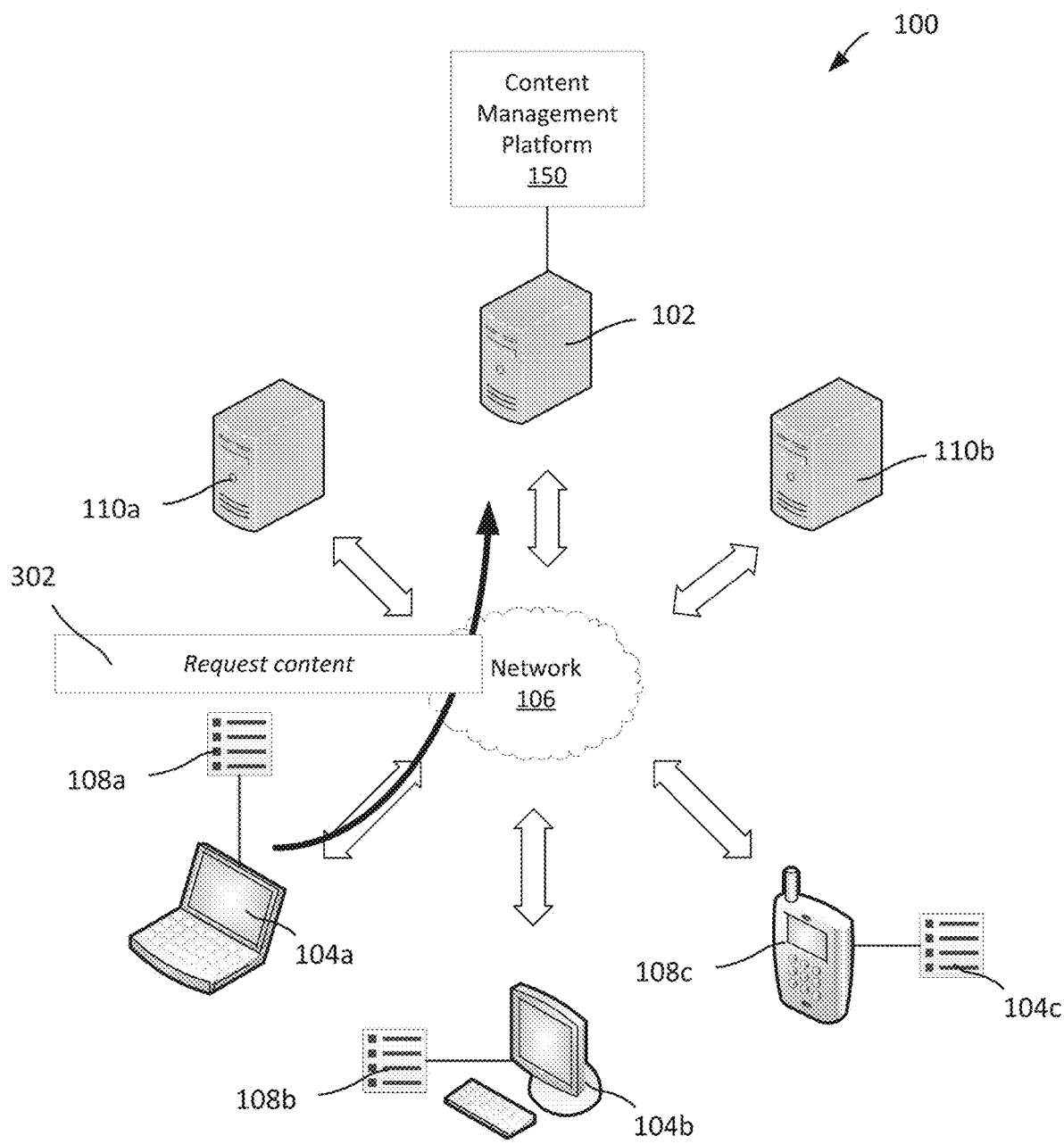

The content management platform 150 stores the transmitted content 300 and makes the content 300 available to other systems (e.g., one or more of the client computer systems 104a-c) for retrieval. As shown in FIG. 3B, a client computer system 104a can request some or all of the content 300 by transmitting a request 302 to the server computer system 102 and the content management platform 150 via the network 106. The request 302 can include information identifying the client computer system 104a and/or a user of the client computer system 104a (e.g., an account associated with the user, access credentials, etc.). Further, the request 302 can include information identifying the specific content being requested (e.g., the identity of one or more particular data files, images, audio files, video files, computerized models, text files, and/or other electronic content). In some cases, multiple pieces of content can be requested at once (e.g., a package of several pieces of content, library of several pieces of content, a compressed file containing several pieces of content, etc.).

Figure 3C:
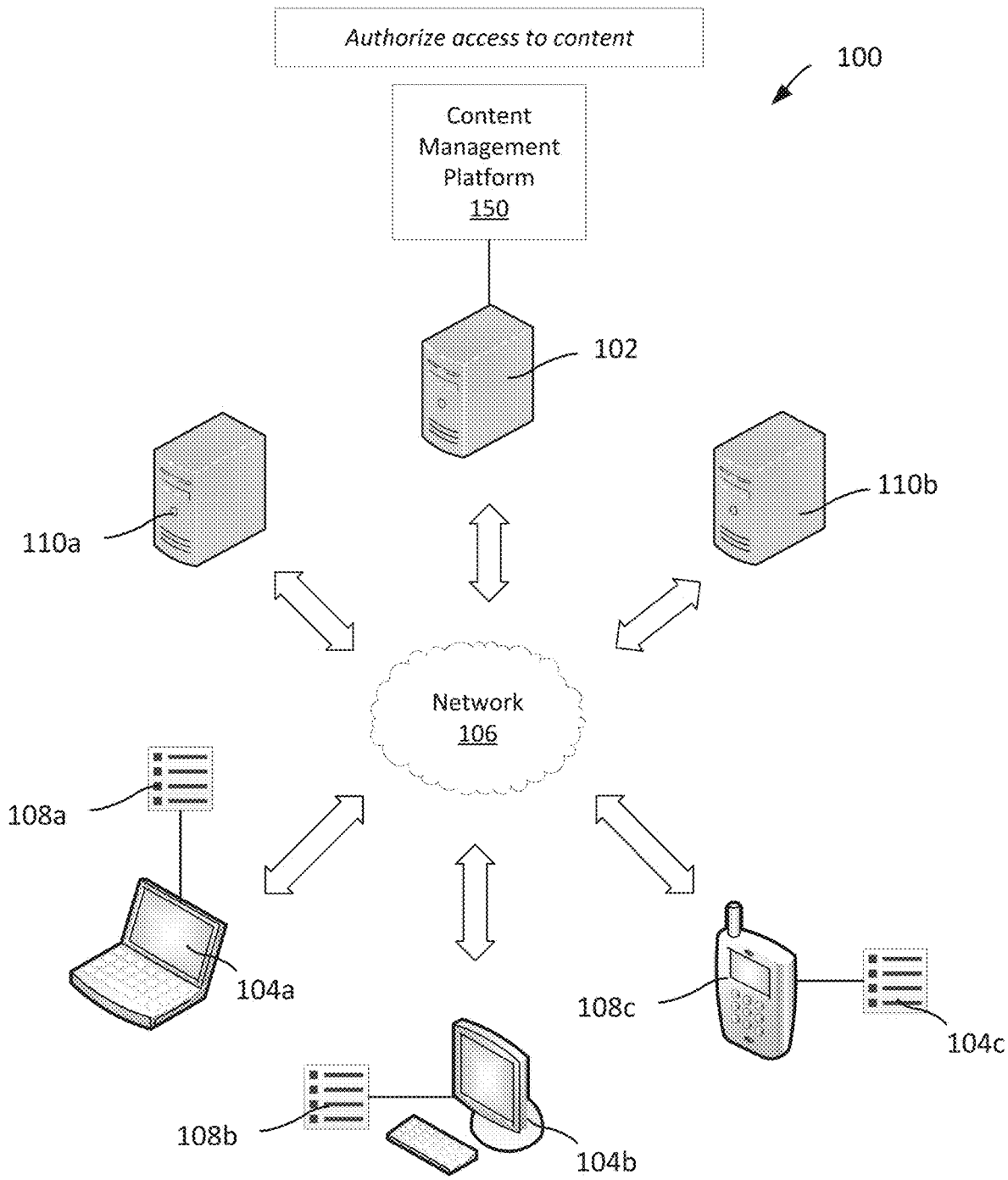

As shown in FIG. 3C, upon receipt of the request 302, the content management platform 150 determines whether the authorize access to the request content by the client computer system 104a. The content management platform 150 can make this determination using a variety of different techniques. In some cases, the content management platform 150 can determine a cost associated with the requested content (e.g., units, credits, monetary funds, etc.), and compare the cost of an amount of available resources associated with the client computer system 104a and/or its user (e.g., a pool of units, credit, monetary funds, etc. available for use). If the cost is lesser than or equal to the amount of available resources, the content management platform 150 can authorize access by the client computer system 104a and/or its user. In some cases, the content management platform 150 can also deduct the cost of the content from the amount of available resources associated with the client computer system 104a and/or its user.

As another example, the content management platform 150 can determine whether the client computer system 104a and/or its user is "whitelisted" with respect to the requested content, and if so, authorize access to the content by the client computer system 104a and/or its user. For instance, the content management platform 150 can maintain a database that includes, for each electronic content item, a list of computer systems and/or users that are authorized the access the electronic content item. The content management platform 150 can identify the client computer system 104a and/or its user based on the information included in the request 302, ascertain whether the client computer system 104a and/or its user is listed as an authorized user, and if so, authorize access.

As another example, the content management platform 150 can determine whether the client computer system 104a and/or its user is "blacklisted" with respect to the requested content, and if not, authorize access to the content by the client computer system 104a and/or its user. For instance, the content management platform 150 can maintain a database that includes, for each electronic content item, a list of computer systems and/or users that are not authorized the access the electronic content item. The content management platform 150 can identify the client computer system 104a and/or its user based on the information included in the request 302, ascertain whether the client computer system 104a and/or its user is listed as an unauthorized user, and if not, authorize access.

Figure 3D:
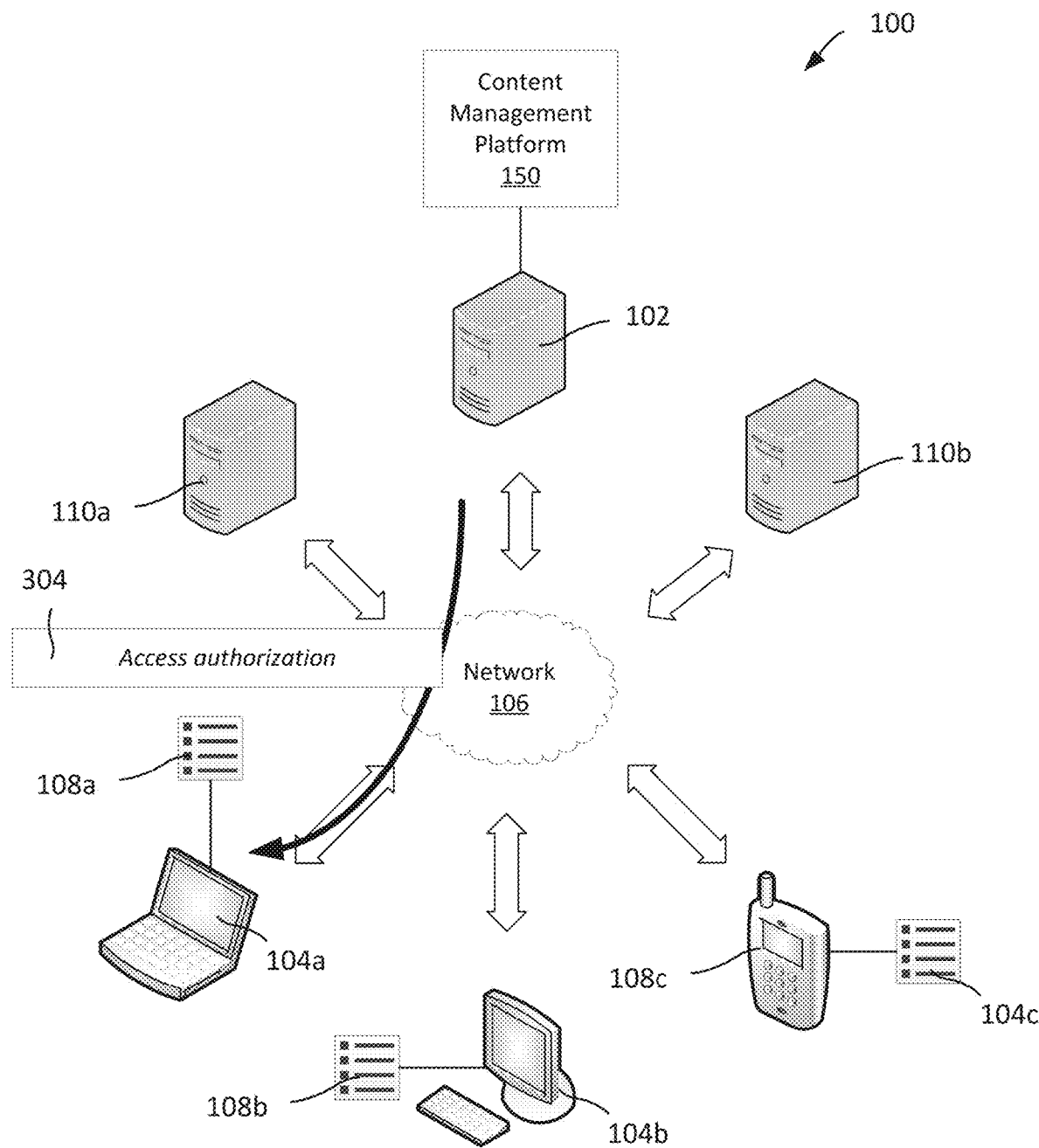

As shown in FIG. 3D, upon determining that the client computer system 104a and/or its user is authorized to access the transmitted content, the content management platform 150 transmits an access authorization message 304 to the client computer 104a. The access authorization message 304 can include, for example, a confirmation of the access authorization, the time that authorization was granted, and/or the period of time for which access is valid. Further, the access authorization message 304 can include information regarding any adjustments made to the account associated with the client computer system 104a and/or its user (e.g., a deduction in the amount of available resources associated with the client computer system 104a and/or its user). Further, the access authorization message 304 can include information indicating any usage restrictions with respect to the request content. For example, the access authorization message 304 can include indications that the requested content can only be included in certain other types of content (e.g., an image can be used as a part of another image, but not in a video). As another example, the access authorization message 304 can indicate whether the request content can be modified by the computer system 104a and/or its user.

Figure 3E:
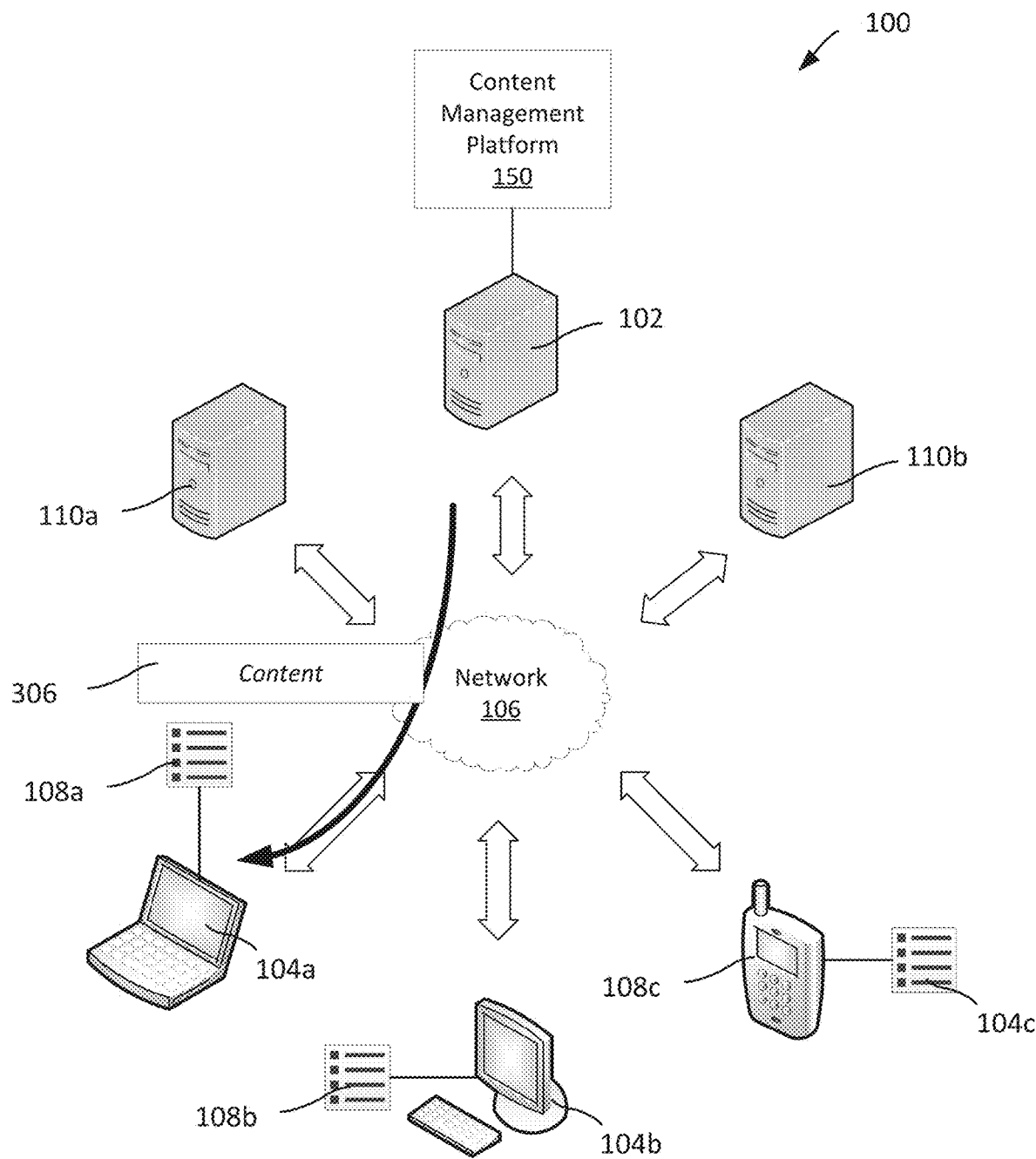

As shown in FIG. 3E, the client computer system 104a retrieves the requested content 306 from the server computer system 102 and the content management platform 150 via the network 106. In some cases, the client computer system 104a can automatically retrieve the requested content 306 upon receipt of the access authorization message 304. In some cases, the client computer system 104a can retrieve the requested content 306 in response to manual input by a user (e.g., a user instruction to the client computer system 104a to retrieve the requested content 306). In some cases, the client computer system 104a can retrieve multiple pieces at once (e.g., a package of several pieces of content, library of several pieces of content, a compressed file containing several pieces of content, etc.).

In some cases, if the requested content 306 is incorporated into other electronic content, the client computer system 104a can automatically retrieve the latest version of the requested content 306 when the other electronic content is accessed by the user. For example, the requested content can include a first computerized model representing a particular component or sub-system. A user can incorporate the first computerized model into a second computerized model representing a larger system (e.g., to simulate the characteristics of the larger system based on the simulated characteristics of the particular component or sub-system). In subsequent sessions, when the user re-opens or re-accesses the second computerized model, the client computer system 104a can automatically determine whether the content management platform 150 has made a more recent version of the first computerized model available to for access. If so, the client computer system 104a can retrieve the more recent version of the first computerized model from the content management platform 150, and automatically incorporate the more recent version of the first computerized model into the second computerized model. This can be beneficial, for example, as any revisions to the content (e.g., revisions to correct errors in the content, improve performance of the content, etc.) are automatically retrieved and incorporated into user's existing works, without requiring manual intervention by a user. Accordingly, the performance of the client computer system 104a can be automatically improved.

After retrieving the requested content 306, the client computer system 104a can use the requested content 306 to produce additional content (subject to any restrictions established by the content management platform 150). For example, if the requested content 306 is an image, the client computer system 104a can incorporate the image into one or more images, videos, animations, etc. As another example, if the requested content 306 is an audio file, the client computer system 104a can incorporate the audio into one or more audio segments, videos, animations, etc. As another example, if the requested content 306 is a computerized model, the client computer system 104a can incorporate the computerized model into one or more other computerized models.

Further, the client computer system 104a can perform one or more operations using the requested content 306. For example, the client computer system 104a can present some or all of the requested content 306 to a user. As another example, the client computer system 104a can modify the requested content 306 (e.g., based on user commands or automatically). As another example, if the requested content 306 is a computerized model, the client computer system 104a can execute a simulation analysis using the computerized model. As another example, the client computer system 104a can share the requested content 306 to others (e.g., via the network 106).

In some cases, the client computer system 104a can retrieve the requested content 306, and use the requested content 306 one or more times without re-retrieving the requested content 306 (e.g., from the content management platform 150). In some cases, each time the requested content 306 is used again, the client computer system 104a can transmit an access request to the content management platform 150 (e.g., in a similar manner as described with respect to FIG. 3B). Upon determining that the client computer system 104a is still authorized the access the content, the content management platform 150 can transmit another access authorization message to the client computer system 104a granting access to the requested content 306. In some cases, the client computer system 104a can include a software agent that selectively enables access to requested content upon receipt of an access authorization message from the content management platform and selectively disables access to requested content in the absence of an access authorization message prior to use of the requested content.

The client computer system 104a also generates usage telemetry data describing the retrieval and/or use of the requested content 306 by the client computer system 104a and/or its user. As an example, the usage telemetry data can include an indication of the identity of the requested content 306 being used (e.g., a unique name, serial number, key number, or other identifier of the content or collection of being used). As an example, the usage telemetry data can include an indication of the time at which the requested content 306 was retrieved by the client computer system 104a, an indication of the number of times that it was retrieved by the client computer system 104a, whether the requested content 306 was shared by the client computer system 104a with others, etc. Further, the usage telemetry data can include an indication whether the requested content 306 was displayed to a user (e.g., whether the contents of the requested content 306 were presented to a user on a display device), and if so, the length of time that it was displayed. Further, the usage telemetry data can include an indication whether the requested content 306 was modified (e.g., whether the computer code, the parameters, or other attributes of the electronic content item were altered), and if so, the nature of the modification. Further, the usage telemetry data can include an indication whether the requested content 306 was incorporated into other electronic content (e.g., inserted into another electronic content, such as a computerized model), and if so, the nature of the incorporation (e.g., the number of times that it was incorporated into other electronic content, the identity of the other electronic content, etc.). Further, the usage telemetry data can include an indication whether any operations were performed using the requested content 306 (e.g., whether the requested content 306 was used in during the execution of a simulation analysis), and if so, the nature of the operations.

Figure 3F:
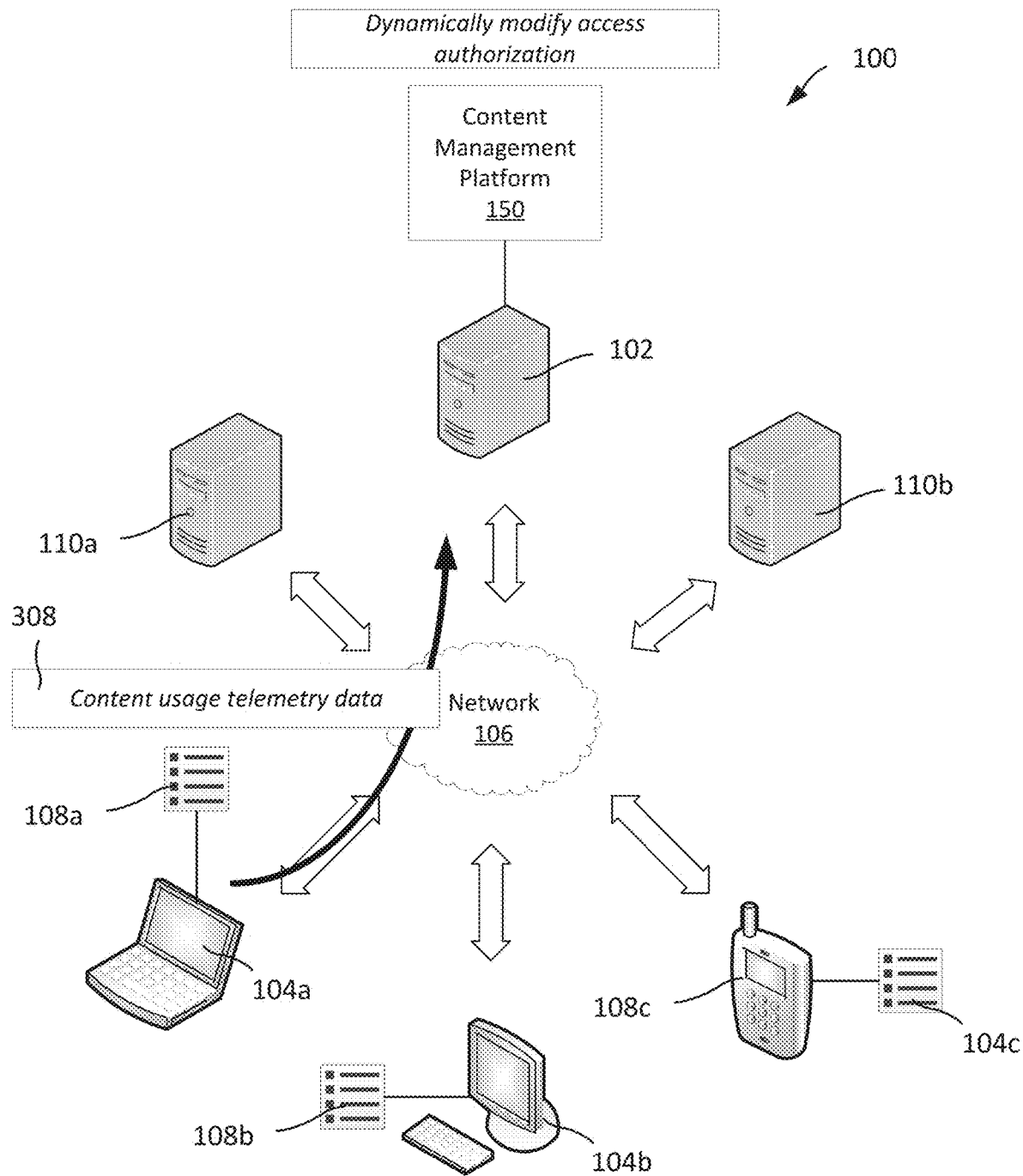

As shown in FIG. 3F, the client computer system 104a transmits the usage telemetry data 308 to the server computer system 102 and the content management platform 150. The content management platform 150 dynamically modifies the access authorization for the client computer system 104a and/or its user based on the transmitted usage telemetry data 308.

In some cases, the client computer system 104a can generate the usage telemetry data 308 continuously, intermittently, periodically, or according to some other pattern. Further, the client computer system 104a can transmit the usage telemetry data 308 to the server computer system 102 and the content management platform 150 continuously, intermittently, periodically, or according to some other pattern. In some cases, the client computer system 104a can continuously "stream" the usage telemetry data 308 to the server computer system 102 and the content management platform (e.g., to transmit usage information in real time or near real time). In some cases, the client computer system 104a can transmit the usage telemetry data 308 to the server computer system 102 and the content management platform 150 in response to a particular trigger event (e.g., an end of a usage session of the requested data, such as the closing of a file, project, content including the requested content, or the closing of a program used to view and/or use the requested content).

The content management platform 150 can dynamically modify the access authorization for the client computer system 104a and/or its user using various techniques. For instance, the content management platform 150 can determine the amount of resources associated with the requested content 306 based on the usage of the requested content 306, and dynamically adjust the resources available to the client computer system 104a and/or its user in response. For example, requested content can be associated with a first cost for a first type of usage (e.g., $N_1$ units for viewing the requested content), a second cost for a second type of usage (e.g., $N_2$ units for modifying the requested content), a third cost for a third type of usage (e.g., $N_3$ units for including the requested content other content), a fourth cost for a fourth type of usage (e.g., $N_4$ units for executing a simulation analysis using the requested content), and so forth. Open receiving usage telemetry data indicating that the requested content 306 is being viewed, the content management platform 150 can determine whether the amount of resources available to the client computer system 104a and/or its user is sufficiently high to enable such usage (e.g., whether the amount of available resources is greater than or equal to $N_1$). If so, the content management platform 150 can authorize the use (e.g., by transmitting an access authorization message, or otherwise not interrupting the use). If not, the content management platform 150 can de-authorize the client computer system 104a from using the requested content in this manner (e.g., by transmitting an access authorization message restricting the use). In some cases, the content management platform 150 can also deduct the cost of the requested content from the amount of available resources associated with the client computer system 104a and/or its user during the use. In some cases, the content management platform 150 can also refund the cost of the requested content after use of the requested content is discontinued. Although example types of usage and costs are described above, these are merely illustrative examples. In practice, requested content can be associated with any number of different costs corresponding to any number of different types of usage.

As another example, requested content can be associated with a cost of $N_5$ each time the requested content is used in a particular way. Open receiving usage telemetry data indicating that the requested content 306 is being used in that way, the content management platform 150 can determine whether the amount of resources available to the client computer system 104a and/or its user is sufficiently high to enable such usage (e.g., whether the amount of available resources is greater than or equal to $N_5$). If so, the content management platform 150 can authorize the use (e.g., by transmitting an access authorization message, or otherwise not interrupting the use). If not, the content management platform 150 can de-authorize the client computer system 104a from using the requested content in this manner (e.g., by transmitting an access authorization message restricting the use). In some cases, the content management platform 150 can also deduct the cost of the requested content from the amount of available resources associated with the client computer system 104a and/or its user during the use. In some cases, the content management platform 150 can also refund the cost of the requested content after use of the requested content is discontinued.

As another example, requested content can be associated with a cost of $N_6$ for each second that the electronic content item is used in a particular way. Open receiving usage telemetry data indicating that the requested content 306 is being used in that way, the content management platform 150 can determine whether the amount of resources available to the client computer system 104a and/or its user is sufficiently high to enable such usage (e.g., whether the amount of available resources is greater than or equal to $N_6$ multiplied by the number of seconds that the requited content was used in that way). If so, the content management platform 150 can authorize the use (e.g., by transmitting an access authorization message, or otherwise not interrupting the use). If not, the content management platform 150 can de-authorize the client computer system 104a from using the requested content in this manner (e.g., by transmitting an access authorization message restricting the use). In some cases, the content management platform 150 can also deduct the cost of the requested content from the amount of available resources associated with the client computer system 104a and/or its user during the use. In some cases, the content management platform 150 can also refund the cost of the requested content after use of the requested content is discontinued.

Further, the content management platform 150 can dynamically allocate resources (e.g., royalties or reimbursements) to one or more entities based on the usage. For example, requested content can be associated with a first royalty for a first type of usage (e.g., $R_1$ units for viewing the requested content), a second royalty for a second type of usage (e.g., $R_2$ units for modifying the requested content), a third royalty for a third type of usage (e.g., $R_3$ units for including the requested content other content), a fourth royalty for a fourth type of usage (e.g., $R_4$ units for executing a simulation analysis using the requested content), and so forth. Open receiving usage telemetry data indicating that the requested content 306 is being viewed, the content management platform 150 can allocate $R_1$ units to an entity (e.g., an owner of the requested content). Although example types of usage and royalties are described above, these are merely illustrative examples. In practice, requested content can be associated with any number of different royalties corresponding to any number of different types of usage.

As another example, requested content can be associated with a royalty of $R_5$ each time the requested content is used in a particular way. Open receiving usage telemetry data indicating that the requested content 306 is being used in that way, the content management platform 150 can allocate $R_5$ units to an entity (e.g., an owner of the requested content).

As another example, requested content can be associated with a royalty of $R_6$ for each second that the electronic content item is used in a particular way. Open receiving usage telemetry data indicating that the requested content 306 is being used in that way, the content management platform 150 can allocate $R_6$ units to an entity (e.g., an owner of the requested content).

In the example shown in FIGS. 3A-3F, the content management platform 150 stores and distributes content to the client compute systems 104a-c on behalf of the content computer systems 110a and 110b. However, this need not be the case. For instance, in some implementations, the content computer systems 110a and 110b can store and distribute content directly to the client compute systems 104a-c. In this configuration, the content management platform 150 can continue to regulate access to the content based on usage telemetry data. An example of this functionality is illustrated in FIGS. 4A and 4B.

In a similar manner as described with respect to FIGS. 3B and 3C, a client computer system 104a can transmit an access request to the server computer system 102 and the content management platform 150 via the network 106. The request can include information identifying the client computer system 104a and/or a user of the client computer system 104a (e.g., an account associated with the user, access credentials, etc.). Further, the request can include information identifying the specific content being requested (e.g., the identity of one or more particular data files, images, audio files, video files, computerized models, text files, and/or other electronic content). Upon receipt of the request, the content management platform 150 determines whether the authorize access to the request content by the client computer system 104a.

Figure 4A:
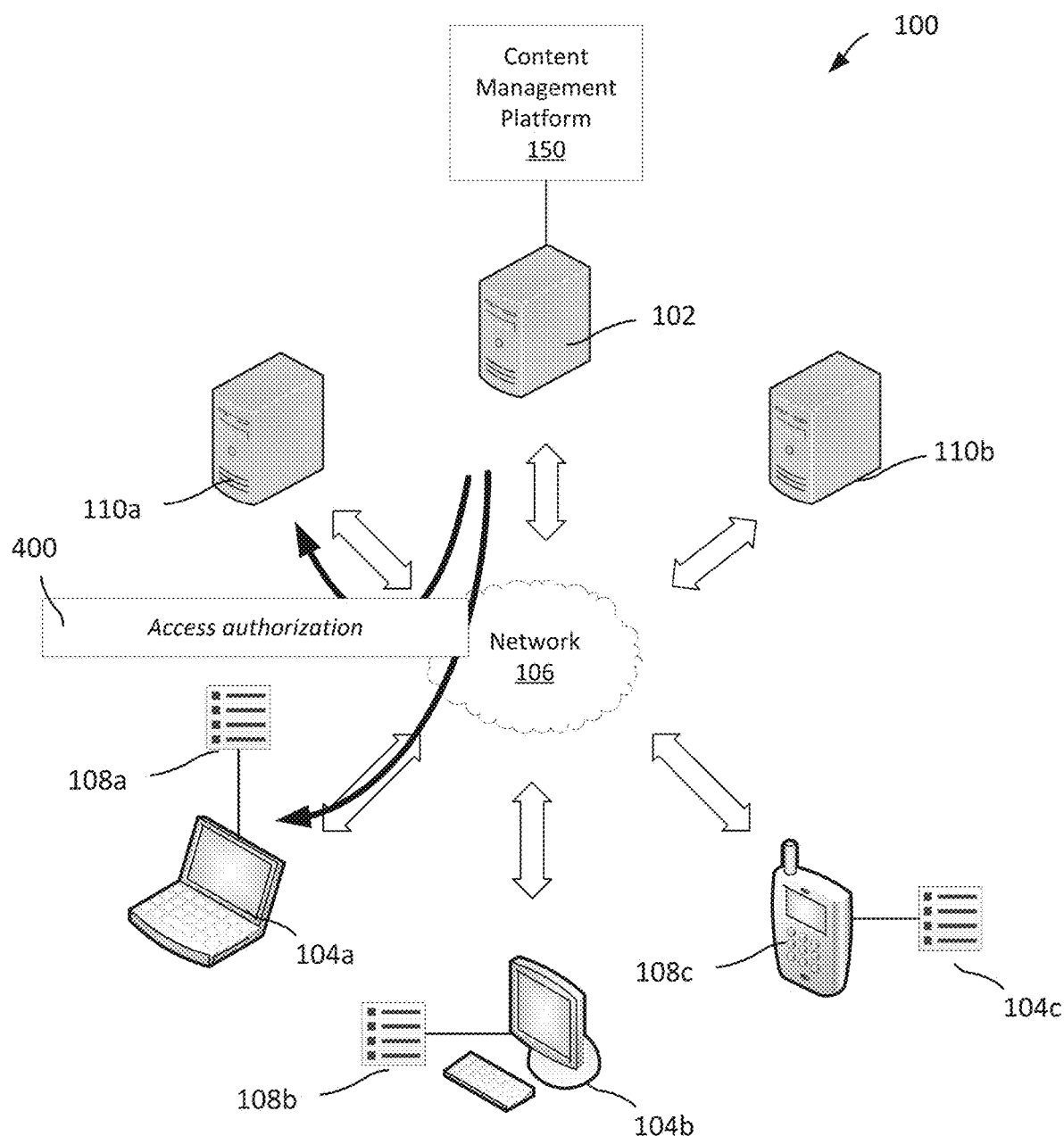
FIGS. 4A-4B are diagrams of another example usage of a system for regulating access to electronic content using usage telemetry.
Figure 4B:
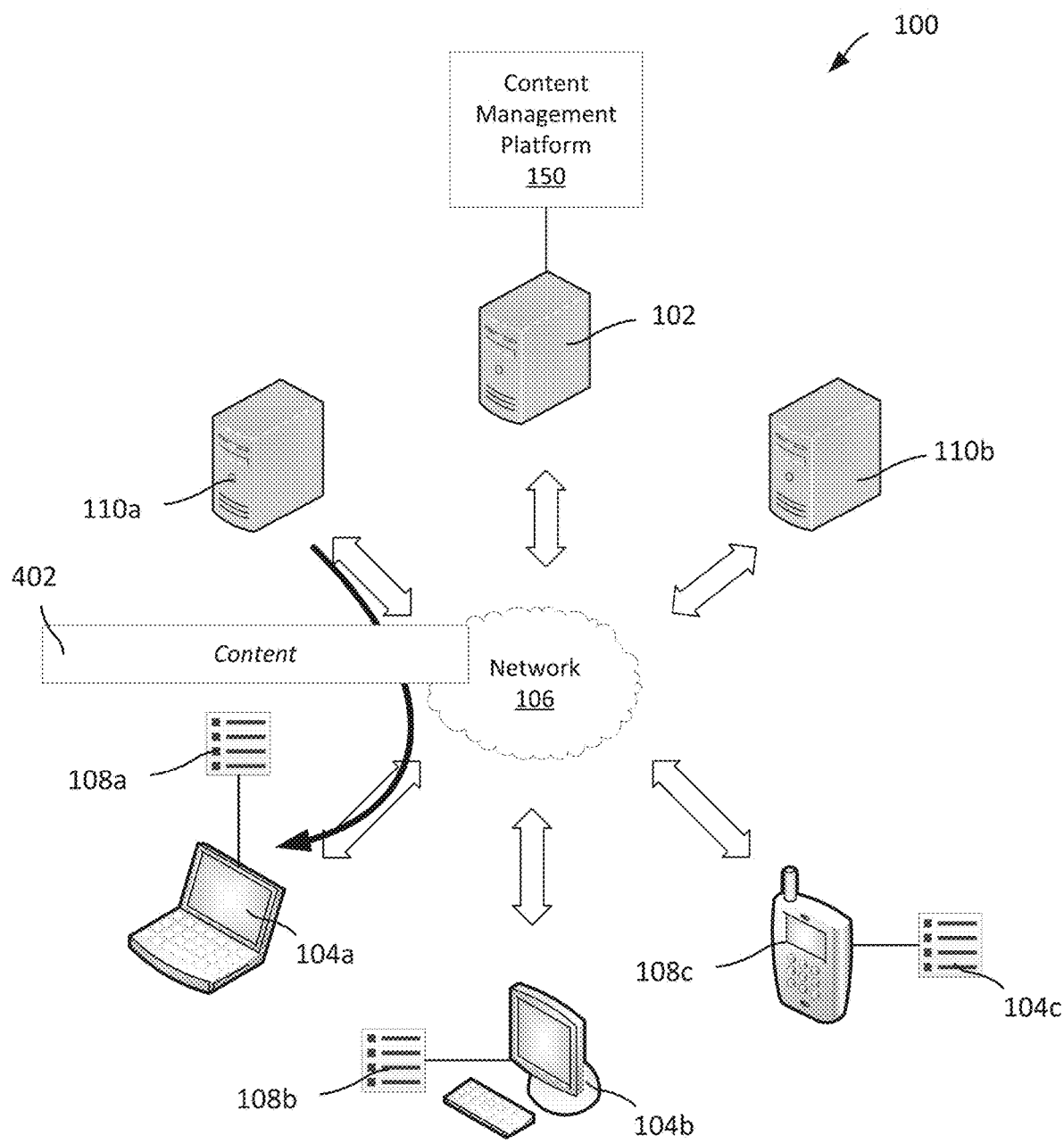

As shown in FIG. 4A, upon determining that the client computer system 104a and/or its user is authorized to access the transmitted content, the content management platform 150 transmits an access authorization message 400 to the client computer 104a. The access authorization message 400 can be similar to that described with respect to FIG. 3D. For example, the authorization message 400 can include a confirmation of the access authorization, the time that authorization was granted, and/or the period of time for which access is valid. Further, the access authorization message 400 can include information regarding any adjustments made to the account associated with the client computer system 104a and/or its user (e.g., a deduction in the amount of available resources associated with the client computer system 104a and/or its user). Further, the access authorization message 400 can include information indicating any usage restrictions with respect to the request content. For example, the access authorization message 304 can include indications that the requested content can only be included in certain other types of content (e.g., an image can be used as a part of another image, but not in a video). As another example, the access authorization message 400 can indicate whether the request content can be modified by the computer system 104a and/or its user.

Further, the content management platform 150 can also transmit the access authorization message 400 to the content computer system storing the requested content (e.g., the content computer system 110a). Accordingly, the content computer system can distribute content to client computer system and/or user in accordance with the information included in the authorization message 400, without the need to independently determine whether a particular client computer system and/or user is authorized to retrieve and usage particular content.

As shown in FIG. 4B, the client computer system 104a retrieves the requested content 402 from the content computer system 100a. In some cases, the client computer system 104a can automatically retrieve the requested content 402 upon receipt of the access authorization message 400. In some cases, the client computer system 104a can retrieve the requested content 402 in response to manual input by a user (e.g., a user instruction to the client computer system 104a to retrieve the requested content 402). In a similar manner as described with respect to FIG. 3E, the client computer system can incorporate the requested content into other electronic content and/or one or more operations using the requested content.

Similarly, in a similar manner as described with respect to FIGS. 3E and 3F, the client computer system 104a can also generate usage telemetry data describing the retrieval and/or use of the requested content by the client computer system 104a and/or its user, and transmit the usage telemetry data to the content management platform 150. The content management platform 150 dynamically modifies the access authorization for the client computer system 104a and/or its user based on the transmitted usage telemetry data.

In some cases, the content management platform 150 can transmit one or more additional access authorization messages to the client computer system 104a and/or the content computer system 110a to notify those systems regarding any modifications. For example, if the client computer system 104a and/or its user are no longer authorized to access a particular electronic content item (e.g., due to changes in usage patterns, available resources, etc.), the content management platform 150 can transmit an access authorization message to the client computer system 104a and/or the content computer system 110a indicating this change in access. Based on the message, the content computer system 110a can discontinue access to the content by the client computer system 104a. As another example, if the client computer system 104a and/or its user are again authorized to access a particular electronic content item (e.g., due to changes in usage patterns, available resources, etc.), the content management platform 150 can transmit another access authorization message to the client computer system 104a and/or the content computer system 110a indicating this change in access. Based on the message, the content computer system 110a can again allow access to the content by the client computer system 104a.

As described herein, each electronic content item can be associated with an amount of resources corresponding to the retrieval and/or use of the electronic content item (e.g., a resource cost). In some cases, if a client computer system retrieves and/or uses multiple electronic content items, the total cost that is assessed to a user's account can be determined based on "stacking" and/or "leveling" techniques.

FIG. 5 shows an example stacking technique of determining resource costs. In this example, nine content items A1-A3, B1-B3, and C1-C3 are made available for retrieval and use. Further, the content items are organized according to different domains A, B, and C. The domains can correspond, for instance, to different categories, classifications, types, collections, or libraries of the content items. As an example, if the content items are computerized models, the domains A, B, and C could correspond to different types of computerized models. For instance, domain A and content items A1-A3 can correspond to computerized models of engines used in vehicles, domain B and content items B1-B3 can correspond to electrical sub-systems used in vehicles, and domain C and content items C1-C3 can correspond to the environmental regulation sub-systems used in vehicles. Further, each domain is associated with a particular cost. In this example, domain A is associated with a cost of 15 units for retrieval and/or use of each content item A1-A3, domain B is associated with a cost of 10 units for retrieval and/or use of each content item B1-B3, and domain C is associated with a cost of 20 units for retrieval and/or use of each content item C1-C3.

If a client computer system retrieves and/or uses multiple electronic content items, the total cost is determined by summing the cost of each of the individual electronic content items that were retrieved and/or used (e.g., "stacking" the total costs together). In this example, a user retrieves and uses content items A2 (corresponding to a cost of 15 units), B1 (corresponding to a cost of 10 units), and B2 (corresponding to a use of 10 units). Accordingly, the total cost for retrieval and usage of these content items is 45 units (e.g., 15+10+10 units).

Figure 6:
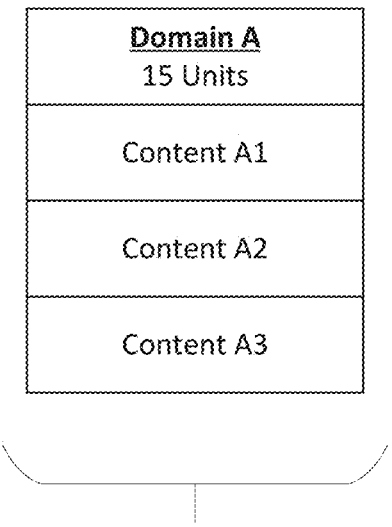
FIG. 6 is a diagram of another example technique for determining a cost associated with the retrieval and/or use of multiple electronic content items.
Figure 6:

FIG. 6 shows an example leveling technique of determining resource costs. In this example, three content items A1-A3 are made available for retrieval and use. The content items A1-A3 are organized according to a single domain A. Further, the domain A is associated with a cost of 15 units for retrieval and/or use of any number of the content items A1-A3. Accordingly, the cost of retrieving and/or using of content items from the domain A are set to a particular "level," regardless of how many different content items are retrieved and/or used from the domain A.

If a client computer system retrieves and/or uses multiple electronic content items from a common domain, the total cost is the cost associated with that domain—regardless if only a single content item was retrieved and used from that domain, or if multiple content items were retrieved and used from that domain. In this example, a user retrieves and uses content items A1 and A2. Accordingly, the total cost for retrieval and usage of these content items is 15 units (e.g., as both of the content items are from the same domain A).

FIG. 7 shows an example technique of determine resource costs based on a combination of stacking and leveling techniques. In this example, the cost of retrieving and/or using content items from a particular domain are "leveled." Accordingly, if a client computer system retrieves and/or uses multiple electronic content items from a common domain, the total cost is the cost associated with that domain—regardless if only a single content item was retrieved and used from that domain, or if multiple content items were retrieved and used from that domain. However, the cost of retrieving and/or using content items from different domains are "stacked." Accordingly, if a client computer system retrieves and/or uses multiple electronic content items from different domains, the total cost is the sum of the cost of each domain from which content was retrieved and/or used.

In this example, in a similar manner as in FIG. 5, nine content items A1-A3, B1-B3, and C1-C3 are made available for retrieval and use. Similarly, the content items are organized according to different domains A, B, and C, where domain A is associated with a cost of 15 units for retrieval and/or use of any number of content items A1-A3, domain B is associated with a cost of 10 units for retrieval and/or use of any number of content items B1-B3, and domain C is associated with a cost of 20 units for retrieval and/or use of any number of content item C1-C3.

If a client computer system retrieves and/or uses multiple electronic content items, the cost of retrieving and/or using content items from a particular domain are "leveled," while the cost of retrieving and/or using content items from different domains are "stacked." In this example, a user retrieves and uses content items A2, B1, and B2. Accordingly, the total cost for retrieval and usage of these content items is 25 units (e.g., 15 units associated with the domain A, plus 10 units associated with the domain B).

Although FIGS. 5-7 show example domains, content items, and costs, these are merely illustrative examples. In practice, a content management system can manage any number of content items, organize those content items according to any number of domains, and associate any number of different costs to the content items. Further, although FIGS. 5-7 show example costs associated with the retrieval and/or use of a content item, these are also merely illustrative examples. As described herein, each content item can be associated with multiple different costs, depending on the circumstances (e.g., costs that vary depending on how the content item is used, how often the electronic content item is used, etc.).

Example Processes

Figure 8:
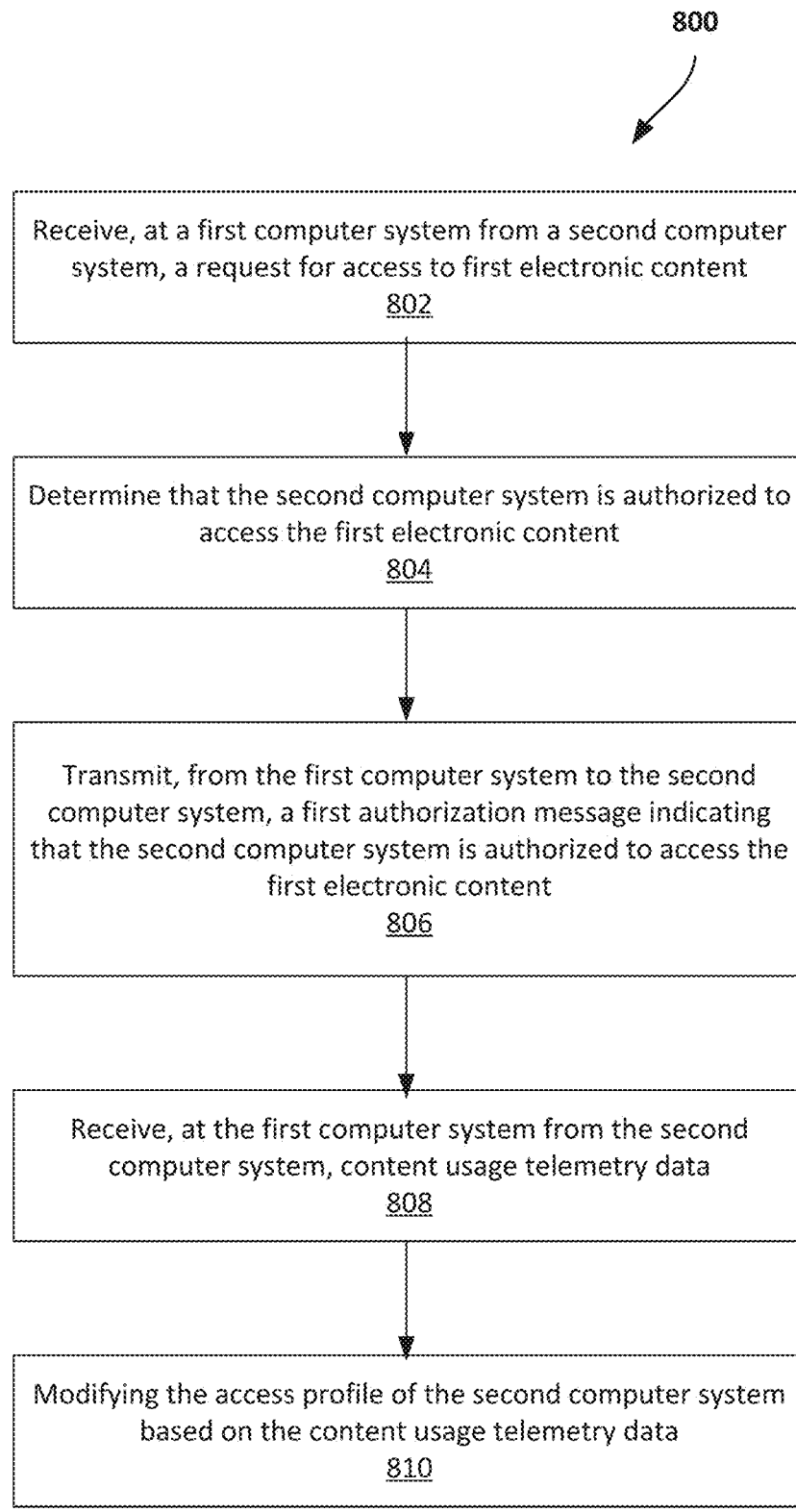
FIG. 8 is a flow chart diagram of an example process for regulating access to electronic content using usage telemetry.

An example process 800 for regulating access to electronic content using usage telemetry data is shown in FIG. 8. The process 800 can be performed for example, using one or more computer systems, as described herein.

In the process 800, a first computer system receives a request for access to first electronic content from a second computer system (step 802). The second computer system is associated with an access profile. As an example, the first computer system can be the server computer system 102 including the content management platform 150 shown and described with respect to FIGS. 1-4. As another example, the second computer system can be the client computer system 104a shown and described with respect to FIGS. 1-4. The first electronic content can include a data object for use in a computerized model, an image, a video, audio, and/or textual data.

The first computer system determines that the second computer system is authorized to access the first electronic content based on the based on the access profile (step 804). Example techniques for making this determination are described, for example, with respect to FIG. 3C.

Further, the first computer system transmits a first authorization message to the second computer system (step 806). The first authorization message indicates that the second computer system is authorized to access the first electronic content. Example techniques for transmitting authorization messages are described, for example, with respect to FIGS. 3D and 4A.

The first computer system receives content usage telemetry data from the second computer system (step 808). The content usage telemetry data includes one or more data items indicating metrics of use of the first electronic content by the second computer system. In some cases, the content usage telemetry data can include one or more data items indicating a length of time that the electronic is in use by the second computer system. In some cases, the content usage telemetry data can include one or more data items indicating one or more types of usage of the first electronic content by the second computer system. The content usage telemetry data can include one or more data items indicating, for each type of usage of the first electronic content by the second computer system, a length of time that the electronic is in use by the second computer system according to that type of usage.

Example usage telemetry data is described, for example, with respect to FIGS. 2 and 3F.

The one or more types of usage can include including the first electronic content in second electronic content, presenting the first electronic content to a user, and/or performing one or more data processing techniques with respect to the first electronic content. In some cases, including the first electronic content in the second electronic content can include including the first electronic content in a computerized model. In some cases, presenting the first electronic content the user can include displaying at least a portion of the first electronic content to the user using a display device. In some cases, performing one or more data processing techniques with respect to the first electronic content can include including the first electronic content in a computerized model and simulating an operation of an apparatus using the computerized model.

In some cases, the content usage telemetry data can be received periodically by the first computer system from the second computer system. In some cases, the content usage telemetry data can be received continuously by the first computer system from the second computer system.

In some cases, the content usage telemetry data can be transmitted by the second computer system to the first computer system in response to a trigger event. The trigger event can be an end of a usage session of the first electronic content.

The first computer system modifies the access profile of the second computer system based on the content usage telemetry data (step 810). Example techniques for modifying an access profile are described, for example, with respect to FIGS. 2 and 3F.

In some cases, the access profile includes an indication of a number of licensing units available for use by the second computer system. Determining that the second computer system is authorized to access the first electronic content can include determining that the number of licensing units available for use by the second computer system is greater than or equal to a number of licensing units associated with the first electronic content. Further, the number of licensing units available for use by the second computer system can be reduced by the number of licensing units associated with the first electronic content responsive to the request. Further, modifying the access profile of the second computer system based on the content usage telemetry data can include increasing or decreasing the number of licensing units available for use by the second computer system based on the content usage telemetry data.

In some implementations, the process can also include determining an amount of funds associated with usage of the first electronic content by the second computer system based on the content usage telemetry data.

In some implementations, first electronic content can be stored by the first computer system. The first computer system can transmit the first electronic content to the second computer system upon determining that the second computer system is authorized to access the first electronic content.

In some implementations, first electronic content can be stored by a third computer system. The third computer system can transmit the first electronic content to the second computer system upon receiving a second authorization message from the first computer system indicating that the first computer system is authorized to access the first electronic content. Examples of this configuration are described, for example, with respect to FIGS. 4A and 4B.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 can be implemented using digital electronic circuitry, or in computer software, firmware, or hardware, or in combinations of one or more of them. In another example, the processes shown in FIG. 8 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
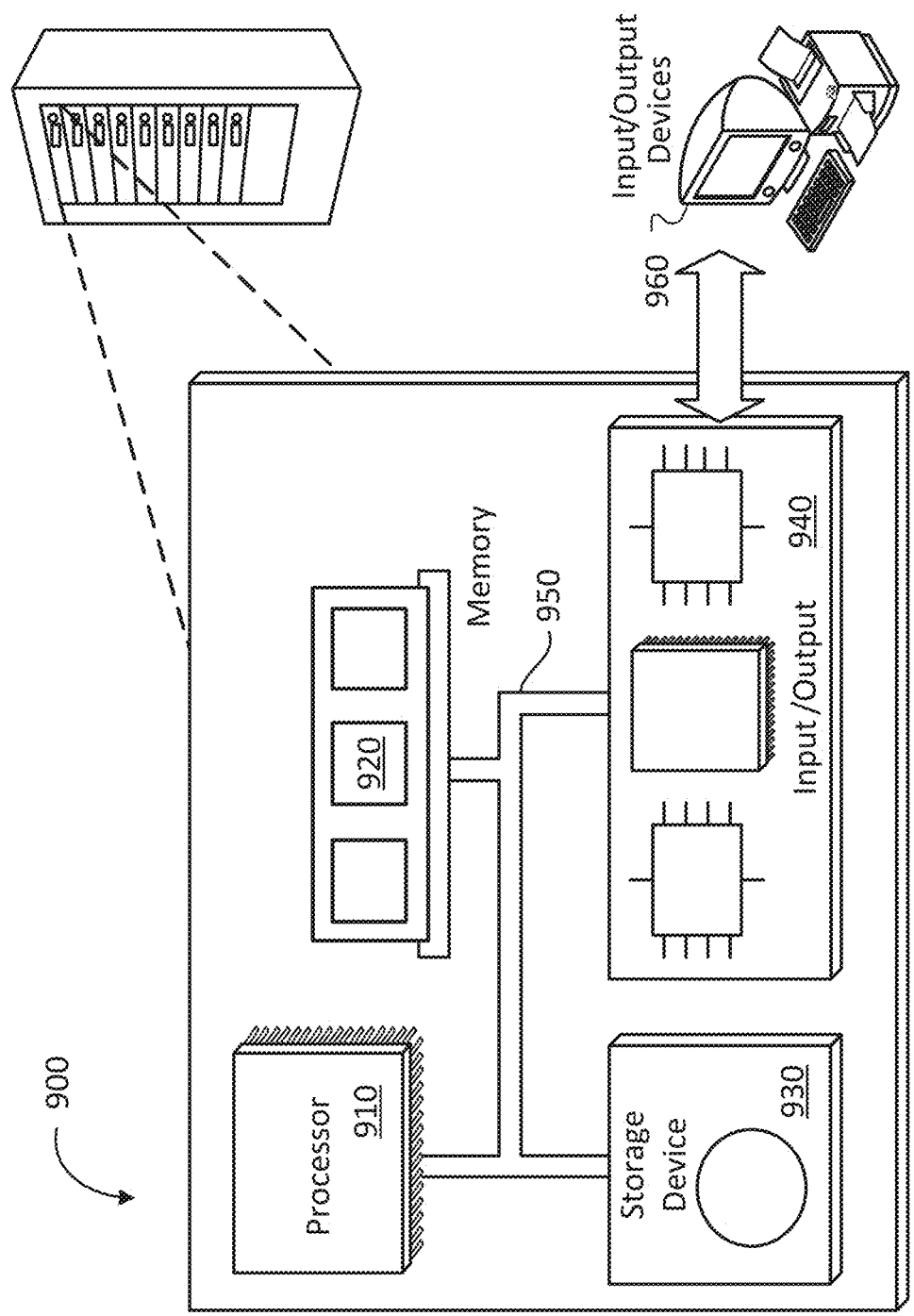
FIG. 9 is a diagram of an example computer system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:

1. A method for regulating access to electronic content based on content usage telemetry data, comprising:
   receiving, by a first computer system from a second computer system, a request for access to first electronic content, the second computer system being associated with an access profile;
   determining, by the first computer system based on the access profile, that the second computer system is authorized to access the first electronic content;
   transmitting, from the first computer system to the second computer system, a first authorization message indicating that the second computer system is authorized to access the first electronic content;
   receiving, by the first computer system from the second computer system, content usage telemetry data,
   wherein the content usage telemetry data comprises one or more data items indicating metrics of use of the first electronic content by the second computer system, including a plurality of types of usage of the first electronic content by the second computer system, and wherein the plurality of types of usage comprise:
      a first type of usage comprising adding the first electronic content in a computerized model and simulating an operation of an apparatus using the computerized model, and
      a second type of usage other than adding the first electronic content in the computerized model and simulating the operation of the apparatus using the computerized model; and
   modifying, by the first computer system, the access profile of the second computer system based on the content usage telemetry data, wherein modifying the access profile of the second computer system comprises:
      upon determining that the second computer system performed the first type of usage, reducing a number of licensing units available for use by the second computer system by a first amount, and
      upon determining that the second computer system performed the second type of usage, reducing the number of licensing units available for use by the second computer system by a second amount different from the first amount.

2. The method of claim 1, wherein the first electronic content comprises one or more of a data object for use in the computerized model, an image, a video, audio, or textual data.

3. The method of claim 1, wherein the content usage telemetry data comprises one or more data items indicating a length of time that the electronic is in use by the second computer system.

4. The method of claim 1, wherein the content usage telemetry data indicates, for each type of usage of the first electronic content by the second computer system, a length of time that the electronic is in use by the second computer system according to that type of usage.

5. The method of claim 1, wherein the one or more types of usage comprise one or more of including the first electronic content in second electronic content, presenting the first electronic content to a user, or performing one or more data processing techniques with respect to the first electronic content.

6. The method of claim 5, wherein presenting the first electronic content the user comprises displaying at least a portion of the first electronic content to the user using a display device.

7. The method of claim 1, wherein the content usage telemetry data is received periodically by the first computer system from the second computer system.

8. The method of claim 1, wherein the content usage telemetry data is received continuously by the first computer system from the second computer system.

9. The method of claim 1, wherein the content usage telemetry data is transmitted by the second computer system to the first computer system in response to a trigger event.

10. The method of claim 9, wherein the trigger event is an end of a usage session of the first electronic content.

11. The method of claim 1,
   wherein determining that the second computer system is authorized to access the first electronic content comprises determining that the number of licensing units available for use by the second computer system is greater than or equal to at least one of the first amount or the second amount.

12. The method of claim 11, wherein modifying the access profile of the second computer system based on the content usage telemetry data comprises increasing or decreasing the number of licensing units available for use by the second computer system based on the content usage telemetry data.

13. The method of claim 1, further comprising determining an amount of funds associated with usage of the first electronic content by the second computer system based on the content usage telemetry data.

14. The method of claim 1, wherein first electronic content is stored by the first computer system, and wherein the first computer system transmits the first electronic content to the second computer system upon determining that the second computer system is authorized to access the first electronic content.

15. The method of claim 1, wherein first electronic content is stored by a third computer system, and wherein the third computer system transmits the first electronic content to the second computer system upon receiving a second authorization message from the first computer system indicating that the first computer system is authorized to access the first electronic content.

16. A system comprising:
one or more processors; and
one or more non-transitory computer-readable media including one or more sequences of instructions which, when executed by the one or more processors, causes:
receiving, by a first computer system from a second computer system, a request for access to first electronic content, the second computer system being associated with an access profile;
determining, by the first computer system based on the access profile, that the second computer system is authorized to access the first electronic content;
transmitting, from the first computer system to the second computer system, a first authorization message indicating that the second computer system is authorized to access the first electronic content;
receiving, by the first computer system from the second computer system, content usage telemetry data,
wherein the content usage telemetry data comprises one or more data items indicating metrics of use of the first electronic content by the second computer system, including a plurality of types of usage of the first electronic content by the second computer system, and
wherein the plurality of types of usage comprise:
a first type of usage comprising adding the first electronic content in a computerized model and simulating an operation of an apparatus using the computerized model, and
a second type of usage other than adding the first electronic content in the computerized model and simulating the operation of the apparatus using the computerized model; and
modifying, by the first computer system, the access profile of the second computer system based on the content usage telemetry data, wherein modifying the access profile of the second computer system comprises:
upon determining that the second computer system performed the first type of usage, reducing a number of licensing units available for use by the second computer system by a first amount, and
upon determining that the second computer system performed the upon determining that the second computer system performed the second type of usage, reducing the number of licensing units available for use by the second computer system by a second amount different from the first amount.

17. A non-transitory computer-readable medium including one or more sequences of instructions which, when executed by one or more processors, causes:
receiving, by a first computer system from a second computer system, a request for access to first electronic content, the second computer system being associated with an access profile;
determining, by the first computer system based on the access profile, that the second computer system is authorized to access the first electronic content;
transmitting, from the first computer system to the second computer system, a first authorization message indicating that the second computer system is authorized to access the first electronic content;
receiving, by the first computer system from the second computer system, content usage telemetry data,
wherein the content usage telemetry data comprises one or more data items indicating metrics of use of the first electronic content by the second computer system, including a plurality of types of usage of the first electronic content by the second computer system, and
wherein the plurality of types of usage comprise:
a first type of usage comprising adding the first electronic content in a computerized model and simulating an operation of an apparatus using the computerized model, and
a second type of usage other than adding the first electronic content in the computerized model and simulating the operation of the apparatus using the computerized model; and
modifying, by the first computer system, the access profile of the second computer system based on the content usage telemetry data, wherein modifying the access profile of the second computer system comprises:
upon determining that the second computer system performed the first type of usage, reducing a number of licensing units available for use by the second computer system by a first amount, and
upon determining that the second computer system performed the second type of usage, reducing the number of licensing units available for use by the second computer system by a second amount different from the first amount.

\* \* \* \* \*

UNITED STATES PATENT AND TRADEMARK OFFICE
CERTIFICATE OF CORRECTION

| | |
|---|---|
| PATENT NO. | : 11,799,864 B2 |
| APPLICATION NO. | : 16/783660 |
| DATED | : October 24, 2023 |
| INVENTOR(S) | : Michael Huebner, Max Fariello and Stephanie A. Scapa |

It is certified that error appears in the above-identified patent and that said Letters Patent is hereby corrected as shown below:

In the Claims

Column 26, Line 3, In Claim 16:
Delete "upon determining that the second computer system performed the upon determining that the second computer system performed the" and insert -- upon determining that the second computer system performed the --.

Signed and Sealed this
Twenty-third Day of January, 2024

*Katherine Kelly Vidal*

Katherine Kelly Vidal
*Director of the United States Patent and Trademark Office*